US007862163B2

(12) United States Patent
Maeno et al.

(10) Patent No.: US 7,862,163 B2
(45) Date of Patent: Jan. 4, 2011

(54) IMAGE FORMING METHOD AND IMAGE FORMING APPARATUS

(75) Inventors: Yutaka Maeno, Kanagawa-ken (JP); Masaaki Konno, Kanagawa-ken (JP); Toshiyuki Makuta, Fujinomiya (JP); Tsutomu Umebayashi, Fujinomiya (JP); Tetsuzo Kadomatsu, Kanagawa-ken (JP)

(73) Assignee: Fujifilm Corporation, Tokyo (JP)

(*) Notice: Subject to any disclaimer, the term of this patent is extended or adjusted under 35 U.S.C. 154(b) by 731 days.

(21) Appl. No.: 11/727,822

(22) Filed: Mar. 28, 2007

(65) Prior Publication Data

US 2008/0012887 A1 Jan. 17, 2008

(30) Foreign Application Priority Data

Mar. 29, 2006 (JP) ............................ 2006-092302

(51) Int. Cl.
*G01D 11/00* (2006.01)

(52) U.S. Cl. ......................... 347/100; 347/95; 347/102; 106/31.13

(58) Field of Classification Search ................. 347/100, 347/102, 95; 106/31.13, 31.6
See application file for complete search history.

(56) References Cited

U.S. PATENT DOCUMENTS 6,232,361 B1 * 5/2001 Laksin et al. ................. 522/84
2002/0140790 A1 * 10/2002 Moriyama et al. ............ 347/96
2004/0103815 A1 6/2004 Honma et al.
2005/0178290 A1 8/2005 Honma et al.
2005/0190252 A1 * 9/2005 Nishizeki et al. ............ 347/105
2006/0071990 A1 * 4/2006 Hirakawa .................... 347/95
2007/0103527 A1 * 5/2007 Satoh ......................... 347/100
2007/0176995 A1 * 8/2007 Kadomatsu et al. ......... 347/103

FOREIGN PATENT DOCUMENTS

JP 2000-44855 A 2/2000
JP 2000-218772 A 8/2000
JP 2003-231838 A 8/2003
WO WO-03/066758 A1 8/2003

OTHER PUBLICATIONS

"Theory behind the bubble pressure method", KRUSS, Theory Measuring Techniques, Mar. 19, 2007, http://www.kruss.info/techniques/bubble_pressure_e.html.

* cited by examiner

*Primary Examiner*—Matthew Luu
*Assistant Examiner*—Rut Patel
(74) *Attorney, Agent, or Firm*—Birch Stewart Kolasch & Birch, LLP

(57) ABSTRACT

The image forming method for forming a desired image on a recording medium, includes the steps of: applying a first liquid on the recording medium, the first liquid containing no coloring material and having a dynamic surface tension at a surface age of 0.1 seconds measured at 25° C. of $\gamma_1$(0.1 s); and then depositing droplets of a second liquid on a region of the recording medium where the first liquid has a form of a liquid film, the second liquid containing coloring material and having a dynamic surface tension at a surface age of 0.1 seconds measured at 25° C. of $\gamma_2$(0.1 s) that is greater than $\gamma_1$(0.1 s).

10 Claims, 13 Drawing Sheets

FIG.7

| LIQUID | STATIC SURFACE TENSION $\gamma_1$(STATIC) (mN/m) | DYNAMIC SURFACE TENSION $\gamma_1$(0.1s) (mN/m) |
|---|---|---|
| 101 | 36.1 | 36.0 |
| 102 | 35.2 | 34.8 |
| 103 | 34.0 | 34.1 |
| 104 | 32.4 | 32.5 |
| 105 | 31.8 | 31.9 |
| 106 | 34.0 | 36.5 |
| 107 | 31.8 | 35.0 |
| 108 | 29.7 | 34.0 |
| 109 | 28.0 | 33.0 |
| 110 | 25.0 | 31.0 |
| 111 | 23.8 | 29.0 |
| 112 | 36.0 | 36.0 |
| 113 | 32.0 | 32.0 |

FIG.8

| LIQUID | STATIC SURFACE TENSION $\gamma_2$(STATIC) (mN/m) | DYNAMIC SURFACE TENSION $\gamma_2$(0.1s) (mN/m) |
|---|---|---|
| 201 | 35.0 | 34.8 |
| 202 | 33.0 | 32.9 |
| 203 | 31.3 | 31.3 |
| 204 | 28.0 | 33.0 |

FIG.9

| | INK | | | 201 | 202 | 203 | 204 |
|---|---|---|---|---|---|---|---|
| | STATIC SURFACE TENSION $\gamma_2$(STATIC) (mN/m) | | | 35.0 | 33.0 | 31.3 | 28.0 |
| | DYNAMIC SURFACE TENSION $\gamma_2$(0. 1s) (mN/m) | | | 34.8 | 32.9 | 31.3 | 33.0 |
| THICKNESS OF LIQUID FILM ($\mu$m) | FIRST LIQUID | STATIC SURFACE TENSION $\gamma_1$(STATIC) (mN/m) | DYNAMIC SURFACE TENSION $\gamma_1$(0. 1s) (mN/m) | | | | |
| 1.4 | 101 | 36.1 | 36.0 | D | D | D | D |
| | 102 | 35.2 | 34.8 | D | D | D | D |
| | 103 | 34.0 | 34.1 | D | D | D | D |
| | 104 | 32.4 | 32.5 | D | D | D | D |
| | 105 | 31.8 | 31.9 | D | D | D | D |
| | 106 | 34.0 | 36.5 | D | D | D | D |
| | 107 | 31.8 | 35.0 | D | D | D | D |
| | 108 | 29.7 | 34.0 | D | D | D | D |
| | 109 | 28.0 | 33.0 | D | D | D | D |
| | 110 | 25.0 | 31.0 | D | D | D | D |
| | 111 | 23.8 | 29.0 | D | D | D | D |
| 1.5 | 101 | 36.1 | 36.0 | D | D | D | D |
| | 102 | 35.2 | 34.8 | D | D | D | D |
| | 103 | 34.0 | 34.1 | D | D | D | D |
| | 104 | 32.4 | 32.5 | D | D | D | D |
| | 105 | 31.8 | 31.9 | D | D | D | D |
| | 106 | 34.0 | 36.5 | D | D | D | D |
| | 107 | 31.8 | 35.0 | D | D | D | D |
| | 108 | 29.7 | 34.0 | D | D | D | D |
| | 109 | 28.0 | 33.0 | D | D | D | D |
| | 110 | 25.0 | 31.0 | D | D | D | D |
| | 111 | 23.8 | 29.0 | D | D | D | D |
| 1.6 | 101 | 36.1 | 36.0 | D | D | D | D |
| | 102 | 35.2 | 34.8 | C | D | D | D |
| | 103 | 34.0 | 34.1 | B | D | D | D |
| | 104 | 32.4 | 32.5 | B | B | D | B |
| | 105 | 31.8 | 31.9 | A | B | D | B |
| | 106 | 34.0 | 36.5 | D | D | D | D |
| | 107 | 31.8 | 35.0 | D | D | D | D |
| | 108 | 29.7 | 34.0 | B | D | D | D |
| | 109 | 28.0 | 33.0 | B | D | D | C |
| | 110 | 25.0 | 31.0 | A | B | B | B |
| | 111 | 23.8 | 29.0 | A | A | B | A |
| | 112 | 36.0 | 36.0 | D | D | D | D |
| | 113 | 32.0 | 32.0 | C | C | D | C |
| 2.0 | 110 | 25.0 | 31.0 | A | B | B | B |
| | 111 | 21.4 | 29.0 | A | A | B | A |
| 5.0 | 110 | 25.0 | 31.0 | A | B | B | B |
| | 111 | 21.4 | 29.0 | A | A | B | A |
| 10.0 | 110 | 25.0 | 31.0 | A | B | B | B |
| | 111 | 21.4 | 29.0 | A | A | B | A |
| NO | | | | E | E | E | E |

FIG.10

| FIRST LIQUID \ INK | 201 | 202 | 203 | 204 |
|---|---|---|---|---|
| 101 | N | N | N | N |
| 102 | N | N | N | N |
| 103 | N | N | N | N |
| 104 | N | N | N | N |
| 105 | N | N | N | N |
| 106 | N | N | N | N |
| 107 | N | N | N | N |
| 108 | N | N | N | N |
| 109 | N | N | N | N |
| 110 | N | N | N | N |
| 111 | N | N | N | N |
| 112 | Y | Y | Y | Y |
| 113 | Y | Y | Y | Y |

N: THERE WAS NO AGGREGATION
Y: THERE WAS AGGREGATION

FIG.11

| | STATIC SURFACE TENSION $\gamma_1$ (STATIC) (mN/m) | DYNAMIC SURFACE TENSION $\gamma_1$ (0.1s) (mN/m) |
|---|---|---|
| 121 | 34.9 | 35.0 |
| 122 | 31.3 | 31.3 |
| 123 | 25.0 | 30.0 |
| 124 | 24.5 | 29.5 |

FIG.12

| | | | | | | | |
|---|---|---|---|---|---|---|---|
| | INK | | | 201 | 202 | 203 | 204 |
| | STATIC SURFACE TENSION $\gamma_2$(STATIC) (mN/m) | | | 35.0 | 33.0 | 31.3 | 28.0 |
| | DYNAMIC SURFACE TENSION $\gamma_2$(0.1s) (mN/m) | | | 34.8 | 32.9 | 31.3 | 33.0 |
| THICKNESS OF LIQUID FILM ($\mu$m) | FIRST LIQUID | STATIC SURFACE TENSION $\gamma_1$(STATIC) (mN/m) | DYNAMIC SURFACE TENSION $\gamma_1$(0.1s) (mN/m) | | | | |
| 5 | 121 | 34.9 | 35.0 | D | D | D | D |
| | 122 | 31.3 | 31.3 | B | B | D | B |
| | 123 | 25.0 | 30.0 | A | A | B | A |
| | 124 | 24.5 | 29.5 | A | A | B | A |

FIG.13

| | INK | | | 201 | 202 | 203 | 204 |
|---|---|---|---|---|---|---|---|
| | STATIC SURFACE TENSION $\gamma_2$(STATIC) (mN/m) | | | 35.0 | 33.0 | 31.3 | 28.0 |
| | DYNAMIC SURFACE TENSION $\gamma_2$(0.1s) (mN/m) | | | 34.8 | 32.9 | 31.3 | 33.0 |
| DROPLET SIZE OF FIRST LIQUID (pl) | FIRST LIQUID | STATIC SURFACE TENSION $\gamma_1$(STATIC) (mN/m) | DYNAMIC SURFACE TENSION $\gamma_1$(0.1s) (mN/m) | | | | |
| 6 | 121 | 34.9 | 35.0 | D | D | D | D |
| | 122 | 31.3 | 31.3 | D | D | D | D |
| | 123 | 25.0 | 30.0 | D | D | D | D |
| | 124 | 24.5 | 29.5 | D | D | D | D |
| 12 | 121 | 34.9 | 35.0 | D | D | D | D |
| | 122 | 31.3 | 31.3 | B | B | D | D |
| | 123 | 25.0 | 30.0 | B | B | D | B |
| | 124 | 24.5 | 29.5 | A | A | A | A |
| 42 | 121 | 34.9 | 35.0 | D | D | D | D |
| | 122 | 31.3 | 31.3 | B | B | D | D |
| | 123 | 25.0 | 30.0 | B | B | D | B |
| | 124 | 24.5 | 29.5 | A | A | A | A |

FIG.14

| FIRST LIQUID | INK | LINE WIDTH | CURING SENSITIVITY | SOLIDIFICATION ON HEAD SURFACE |
|---|---|---|---|---|
| 131 | 231 | SATISFACTORY | A | 42% |
| | 232 | SATISFACTORY | A | 63% |
| | 233 | SATISFACTORY | B | 71% |
| 132 | 231 | SATISFACTORY | B | 52% |
| | 232 | SATISFACTORY | C | 73% |
| | 233 | SATISFACTORY | A | 98% |
| 133 | 231 | SATISFACTORY | A | 53% |
| | 232 | SATISFACTORY | A | 70% |
| | 233 | SATISFACTORY | C | 82% |

IMAGE FORMING METHOD AND IMAGE FORMING APPARATUS

BACKGROUND OF THE INVENTION

1. Field of the Invention

The present invention relates to an image forming method and an image forming apparatus, and more particularly, to an image forming method and an image forming apparatus for forming images on a recording medium by applying at least two types of liquid on a prescribed recording medium.

2. Description of the Related Art

Image forming apparatuses which form desired images on a recording medium by applying droplets of ink on a prescribed recording medium, frequently use a shuttle scanning system in which a liquid ejection head is mounted on a carriage, and printing of a line corresponding to a nozzle row is completed by means of a plurality of scans (split printing is carried out). When using a UV ink which is cured by irradiation of ultraviolet light, an ultraviolet light irradiation device is mounted on the carriage, together with the droplet ejection head, and the ink can be cured by radiating ultraviolet light during each scanning action. This method makes it possible to avoid mutually adjacent dots from coming into contact with each other in a droplet state.

However, in order to enhance the recording speed, it is required to use a full line type of liquid ejection head having a nozzle row corresponding to the width of the full recordable region on the recording medium (in other words, the page width), thereby completing the printing of one page in a single scan. In this case, printing of a line corresponding to a nozzle row can be completed by means of a "single pass", without performing reciprocal scanning with the liquid ejection head in the main scanning direction as in the shuttle scanning method.

In the full line type head, in contrast to the shuttle scanning method carrying out split printing, the ink cannot be cured in each scanning action, and therefore high image quality cannot be achieved unless coalescence of ink droplets that are deposited on mutually adjacent positions is prevented. This situation applies similarly to a shuttle scanning type of printer that completes printing corresponding to nozzle rows by means of a single scan, without performing split printing.

Japanese Patent Application Publication Nos. 2000-218772 and 2000-044855 disclose technologies in which, in order to avoid interference (which is hereinafter referred to as "depositing interference") between ink droplets deposited on the recording medium, a two-liquid system is used and the coloring material in the ink is caused to aggregate or become insoluble by means of a chemical reaction on the recording medium.

Moreover, Japanese Patent Application Publication No. 2003-231838 discloses an ink having a dry viscosity of 100 mPa·s or below, and a dynamic surface tension of not less than 45 mN/m at 10 ms, and not greater than 35 mN/m at 1000 ms.

FIG. 15 shows a state where ink droplets 90*a* and 90*b* are deposited on a recording medium 16 in the related art. When the two ink droplets 90*a* and 90*b* deposit at mutually adjacent depositing positions and make contact with each other, the ink droplets 90*a* and 90*b* seek to reduce the surface area of the air-liquid interface, in other words, to minimize the surface energy of the ink droplets. Hence, the two ink droplets 90*a* and 90*b* coalesce and a unified ink droplet 90*c* is formed. This gives rises to so-called "depositing interference", which is a phenomenon where the ink droplets move to unintended positions. This phenomenon is marked in the case of recording media into which the ink does not permeate, or only permeates slowly.

If the coloring material in the ink is caused to aggregate or become insoluble in order to avoid the depositing interference of this kind, as described in Japanese Patent Application Publication Nos. 2000-218772 and 2000-044855, then there is a problem in that color reproducibility is impaired. More specifically, with the aggregation and insolubilization processes, the size of the coloring material particles becomes larger, and accordingly variations in color tone and deterioration of color saturation occur. This is particularly unsuitable in package label printing, where bright and vibrant images are demanded. In cases of non-aqueous inks such as UV inks, there is also a problem in that no aggregating agent capable of causing a sufficiently fast reaction is available.

Japanese Patent Application Publication No. 2003-231838 describes the issue of dynamic surface tension, but it does not make any mention of the relationship of dynamic surface tensions between two liquids in the two-liquid system.

SUMMARY OF THE INVENTION

The present invention has been contrived in view of the foregoing circumstances, an object thereof being to provide an image forming method and image forming apparatus whereby the depositing interference can be avoided without impairing color reproducibility.

In order to attain the aforementioned object, the present invention is directed to an image forming method for forming a desired image on a recording medium, the method comprising the steps of: applying a first liquid on the recording medium, the first liquid containing no coloring material and having a dynamic surface tension at a surface age of 0.1 seconds measured at 25° C. of $\gamma_1$(0.1 s); and depositing droplets of a second liquid on a region of the recording medium where the first liquid has a form of a liquid film, the second liquid containing coloring material and having a dynamic surface tension at a surface age of 0.1 seconds measured at 25° C. of $\gamma_2$(0.1 s) that is greater than $\gamma_1$(0.1 s).

In embodiments of the present invention, the dynamic surface tension is determined according to the Maximum Bubble Pressure Method. In the Maximum Bubble Pressure Method, a bubble is formed in the object liquid by sending gas at a predetermined flow rate from a capillary with a known radius r that sinks in the liquid. The pressure of the gas is measured during the bubble formation, and the maximum pressure is determined. The surface tension ($\sigma$) at a surface age is determined according to this maximum pressure ($\rho_{max}$), the initial pressure ($\rho_0$) in the capillary, and the inner radius (r) of the capillary. More specifically, the surface tension at a surface age is determined according to the following formula: $\sigma=(\rho_{max}-\rho_0)\times r/2$. The surface age corresponds to time that elapses before the pressure becomes the maximum. Surface tensions for various surface ages are measured by changing the flow rate of the gas, and the dynamic surface tension can be determined according to the surface tensions thus measured.

According to this aspect of the present invention, there is no aggregation or insolubilization of the coloring material contained in the second liquid, and the depositing interference can be avoided as follows.

Firstly, the first liquid which does not contain coloring material is applied on the recording medium by droplet ejection or by a coater, thereby forming a liquid film having a thickness within the target range, on the recording medium. Next, while the air-liquid interface is restricted to the boundary surface between the first liquid and the atmosphere only, in other words, without there being any change in the surface area of the air-liquid interface, droplets of the second liquid containing coloring material (ink droplets) are deposited on the region where the first liquid is applied in the form of a liquid film, and the droplets of the second liquid are caused to submerge into the liquid film composed of the first liquid. In so doing, since there is no change in the surface area of the air-liquid interface, then the droplets of the second liquid do not coalesce with each other, and the depositing interference between the droplets of the second liquid can be avoided.

By adopting a composition in which at least the droplets of the second liquids are cured by irradiation of radiation, such as ultraviolet light or an electron beam, while the depositing interference is prevented (normally, for a period of several hundred milliseconds to several seconds), it is possible to make the coloring material contained in the droplets of the second liquid become fixed more reliably on the recording medium.

A high-quality image can be formed by using a recording medium (for example, OPP (oriented polypropylene film), CPP (casted polypropylene film), PE (polyethylene), PET (polyethylene terephthalate), or other materials having low permeability, such as soft packaging material, laminated paper, coated paper, art paper, or the like) which is not permeable to the ink.

Preferably, in the applying step of the first liquid, the first liquid is applied to form the liquid film having an average thickness of not less than 1.6 μm on the recording medium.

According to this aspect of the present invention, it is possible reliably to prevent coalescence between droplets of the second liquid (ink droplets) on the recording medium.

The average thickness of the liquid film composed of the first liquid is not greater than 100 μm, and desirably, not greater than 20 μm.

Preferably, the image forming method further comprises the step of: after the depositing step of the droplets of the second liquid, irradiating the recording medium with radiation, wherein the second liquid contains a second polymerizable compound which is curable by the radiation.

According to this aspect of the present invention, the droplets of the second liquid are cured while the shape of the droplets of the second liquid is maintained (normally, within a time period of several hundreds milliseconds to several seconds), and hence the coloring material contained in the droplets of the second liquid can be fixed more reliably on the recording medium.

Preferably, the first liquid contains a first polymerizable compound which is curable by the radiation.

According to this aspect of the present invention, the first liquid which contains no coloring material is also cured, and therefore it is possible to achieve rapid and reliable fixing.

Preferably, a polymerization initiator is contained in one of the first liquid and the second liquid.

Preferably, the first liquid contains an oxirane compound serving as a first polymerizable compound which is curable by the radiation; and the second liquid contains a polymerization initiator, and contains an oxetane compound as the second polymerizable compound.

According to this aspect of the present invention, a polymerization initiator and a polymerizable compound (an oxirane compound) capable of quick start of polymerization reaction are applied separately on the recording medium, and therefore it is possible to avoid problems of ejection defects caused by curing on the ejection face of the head as a result of leaking of the radiation.

Preferably, the applying step of the first liquid includes the step of depositing droplets of the first liquid on the recording medium.

According to this aspect of the present invention, it is possible to apply the first liquid readily, only on the region of the recording medium necessary for deposition of the second liquid containing coloring material.

Preferably, the first liquid has a static surface tension of not greater than 25 mN/m.

According to this aspect of the present invention, it is possible to make the first liquid spread rapidly and uniformly over the recording medium, by the time that the droplets of the second liquid are deposited.

Preferably, the depositing step of the droplets of the second liquid is performed in a single pass.

According to this aspect of the present invention, it is possible to form an image at high speed.

In order to attain the aforementioned object, the present invention is also directed to an image forming apparatus which forms a desired image on a recording medium, comprising: a first liquid application device which applies a first liquid on the recording medium, the first liquid containing no coloring material and having a dynamic surface tension at a surface age of 0.1 seconds measured at 25° C. of $\gamma_1(0.1\ s)$; and a second liquid application device which deposits droplets of a second liquid on a region of the recording medium where the first liquid has a form of a liquid film, the second liquid containing coloring material and having a dynamic surface tension at a surface age of 0.1 seconds measured at 25° C. of $\gamma_2(0.1\ s)$ that is greater than $\gamma_1(0.1\ s)$.

According to this aspect of the present invention, it is possible to avoid the depositing interference without impairing color reproducibility.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 7 is a table showing the static surface tension and the dynamic surface tension of first liquids according to Practical example 1;

FIG. 8 is a table showing the static surface tension and the dynamic surface tension of second liquids (inks) according to Practical example 1;

FIG. 9 is a table indicating the depositing interference in the case of Practical example 1;

FIG. 10 is a table indicating the aggregation properties in the case of Practical example 1;

FIG. 11 is a table showing the static surface tension and the dynamic surface tension of first liquids according to Practical example 2;

FIG. 12 is a table indicating the depositing interference in the case of Practical example 2;

FIG. 13 is a table showing the depositing interference in a case where droplets of the first liquid are ejected by droplet ejection in Practical example 2;

FIG. 14 is a table showing Practical example 3; and

DETAILED DESCRIPTION OF THE PREFERRED EMBODIMENTS

Principles of the Present Invention

The principle of the present invention for forming an image on a recording medium while avoiding the depositing interference is described with reference to FIGS. 1A to 1E.

Figure 1A:
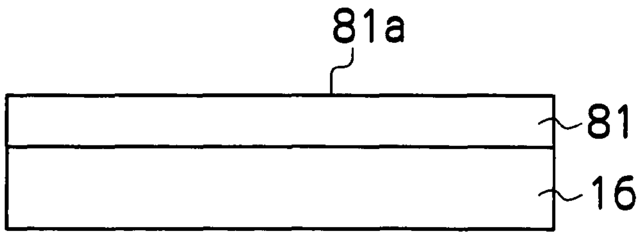
FIGS. 1A to 1E are schematic drawings used to describe the principles of the present invention.

Firstly, as shown in FIG. 1A, a first liquid that does not contain coloring material is applied on the recording medium 16, and a liquid film 81 composed of the first liquid is thus formed on the surface of the recording medium 16. In this case, the first liquid may be applied onto the recording medium 16 by ejection and deposition of droplets of the first liquid (also called "liquid ejection") or by application with a roller, blade, etc. The method of depositing the droplets is preferable in that it is possible to form the liquid film composed of the first liquid readily, only in the region where the first liquid is required to be applied as the preparation for the deposition of a second liquid (which is hereinafter also referred to as "ink") containing coloring material.

The liquid film of the first liquid thus formed has an average thickness calculated by dividing the volume of the applied first liquid by the surface area of the portion on which the first liquid is applied. In cases where the first liquid is applied by the droplet deposition, the film thickness can be calculated in accordance with the volume of droplets ejected and the surface area of the portion on which the droplets of the first liquid are deposited. Desirably, the thickness of the film of the first liquid is uniform and there are no local variations in thickness. From this viewpoint, desirably, the first liquid has good wetting properties (in other words, a low static surface tension), whereby it spreads readily over the recording medium 16, while the wetting properties fall within the range in which the first liquid can be ejected stably from a liquid ejection head performing the droplet ejection.

Figure 1B:
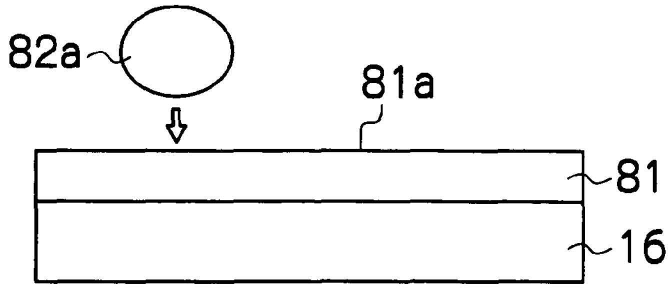
Figure 1C:
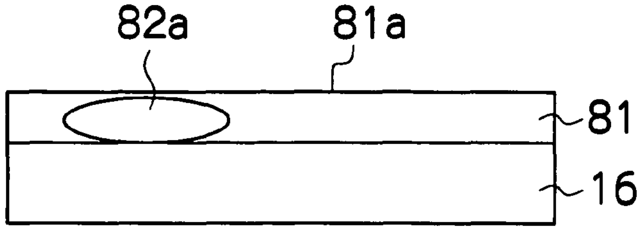

Thereupon, as shown in FIG. 1B, a droplet 82*a* (first ink droplet) of the second liquid (ink) containing coloring material is deposited toward the region where the liquid film 81 composed of the first liquid has been formed on the recording medium 16, in a state where the only air-liquid interface is the boundary surface 81*a* between the first liquid and the atmosphere, in other words, where there is substantially no change to the surface area of the air-liquid interface 81*a*. By means of this droplet deposition, as shown in FIG. 1C, the first ink droplet 82*a* becomes submerged into the liquid film 81.

Figure 1D:
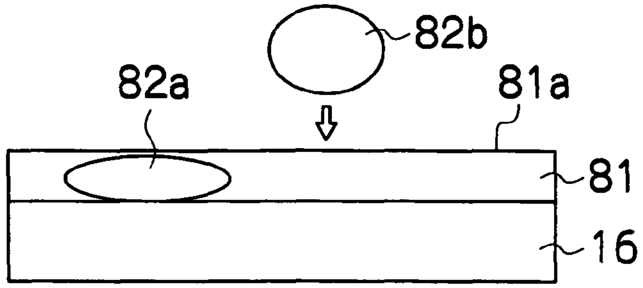
Figure 1E:
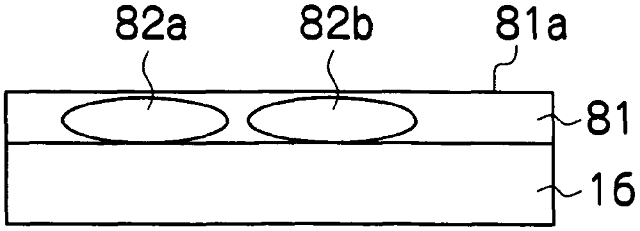

Then, as shown in FIG. 1D, a second ink droplet 82*b* is further deposited within the region where the liquid film 81 composed of the first liquid has been formed on the recording medium 16, in the vicinity of the depositing position of the first ink droplet 82*a* that has been deposited previously. As shown in FIG. 1E, the second ink droplet 82*b* also becomes submerged into the liquid film 81.

By submerging the plurality of ink droplets 82*a* and 82*b* inside the liquid film 81 composed of the first liquid, then even if the plurality of droplets 82*a* and 82*b* deposit in positions that are mutually adjacent, no new air-liquid interface is created. More specifically, the only boundary interface between the gas and the liquid is the boundary interface 81*a* between the atmosphere and the liquid film 81 composed of the first liquid, and therefore, the surface area of the air-liquid interface 81*a* does not change.

If a plurality of ink droplets 82*a* and 82*b* are deposited in a state where there is no liquid film 81 composed of the first liquid on the recording medium 16, then the depositing interference occurs due to coalescence of the plurality of the ink droplets 82*a* and 82*b* as they seek to reduce the surface area of the air-liquid interface, in other words, to minimize the surface energy. However, according to the present invention, the depositing interference of this kind can be avoided.

In the related art, in order to avoid the depositing interference, a material that generates a chemical reaction that causes the coloring material to aggregate or become insoluble is contained in the first liquid, but in the present invention, it is possible to avoid the depositing interference without adding a material of this kind to the first liquid.

In order to form an image on a recording medium while preventing the depositing interference as described above, it is necessary to set a suitable relationship between the dynamic surface tension of the first liquid and the dynamic surface tension of the second liquid (ink). This relationship between the dynamic surface tensions of the two liquids is described in more detail below.

Furthermore, during a period of time (a time period from several hundreds milliseconds to 5 seconds, in the present embodiment) in which the depositing interference is avoided and the shapes of the ink droplets 82*a* and 82*b* are being maintained inside the liquid film 81 as shown in FIG. 1E, in other words, before the dot shapes become disrupted, the ink droplets 82*a* and 82*b* are cured and the coloring material inside the ink droplets 82*a* and 82*b* becomes fixed to the recording medium 16. The second liquid (ink), at the least, contains a polymerizable compound that is radiation-curable and is cured by a so-called polymerization reaction when irradiated with radiation ray, such as ultraviolet light. The first liquid may also contain a polymerizable compound, and this is desirable since the whole of the first liquid deposited can be cured and hence fixing properties can be improved.

General Composition of Image Forming Apparatus

Figure 2:
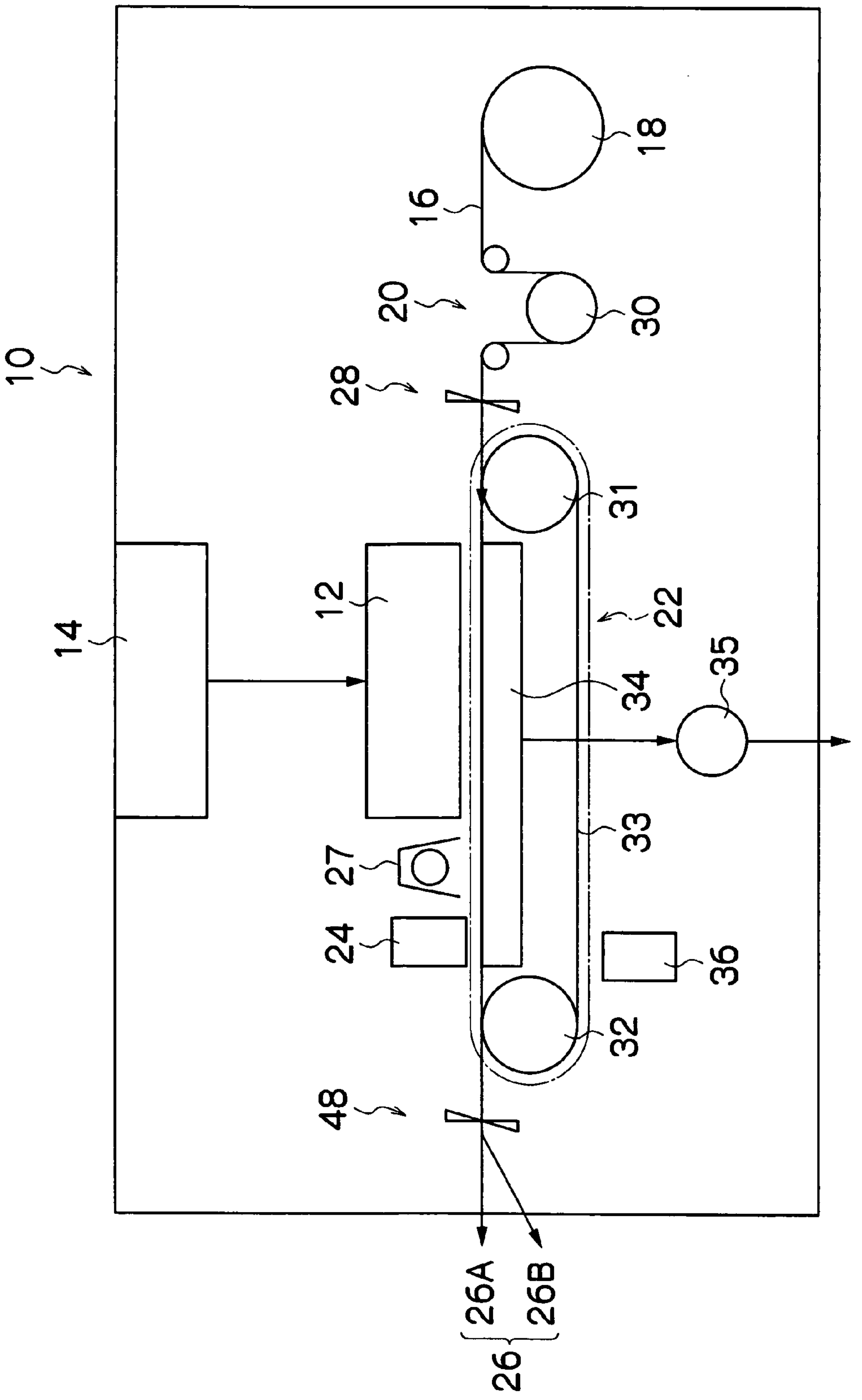
FIG. 2 shows a general schematic drawing of an image forming apparatus according to an embodiment of the present invention.

FIG. 2 shows the general composition of an image forming apparatus 10 according to an embodiment of the present invention. This image forming apparatus 10 forms desired images on a prescribed recording medium 16, by applying, onto the recording medium 16, at least two types of liquid including the first liquid that does not contain coloring material, for forming the liquid film, and the second liquid (ink) that does contain coloring material.

In FIG. 2, the image forming apparatus 10 has a liquid application unit 12, which applies the first liquid and the ink onto the recording medium 16 by means of droplet ejection.

Furthermore, the image forming apparatus 10 includes: a liquid storing and loading unit 14, which stores the first liquid and the ink for supply to the liquid application unit 12; a paper supply unit 18, which supplies the recording medium 16, such as paper; a decurling unit 20, which removes curl from the recording medium 16; a belt conveyance unit 22, disposed facing the ejection face of the liquid application unit 12, which conveys the recording medium 16 while keeping the recording medium 16 flat; an image determination unit 24, which reads in an image resulting from the ejection of the ink droplets by the liquid application unit 12 (namely, the deposition state of the ink droplets); and a paper output unit 26, which outputs the printed recording medium to the exterior.

In FIG. 2, a supply of rolled paper (continuous paper) is displayed as one example of the paper supply unit 18, but it is also possible to use a supply unit which supplies cut paper that has been cut previously into sheets. In a case where rolled paper is used, a cutter 28 is provided. Therefore, the recording medium 16 delivered from the paper supply unit 18 generally retains curl. In order to remove this curl, heat is applied to the recording medium 16 in the decurling unit 20 by a heating drum 30 in the direction opposite to the direction of the curl. After decurling in the decurling unit 24, the cut recording medium 16 is delivered to the belt conveyance unit 22.

The suction belt conveyance unit 22 has a configuration in which an endless belt 33 is set around rollers 31 and 32 so that the portion of the endless belt 33 facing at least the ejection face of the liquid application unit 12 and the sensor surface of the image determination unit 24 forms a horizontal plane (flat plane). The belt 33 has a width that is greater than the width of the recording medium 16, and a plurality of suction apertures (not shown) are formed on the belt surface. A suction chamber 34 is disposed in a position facing the ejection face of the liquid application unit 12 and the sensor surface of the image determination unit 24 on the interior side of the belt 33, which is set around the rollers 31 and 32; and the suction chamber 34 provides suction with a fan 35 to generate a negative pressure, thereby holding the recording medium 16 onto the belt 33 by suction. The belt 33 is driven in the counter-clockwise direction in FIG. 2 by the motive force of a motor (not illustrated) being transmitted to at least one of the rollers 31 and 32, which the belt 33 is set around, and the recording medium 16 held on the belt 33 is conveyed from right to left in FIG. 2. Since ink adheres to the belt 33 when a marginless print or the like is formed, a belt cleaning unit 36 is disposed in a predetermined position (a suitable position outside the recording region) on the exterior side of the belt 33.

Figure 3:
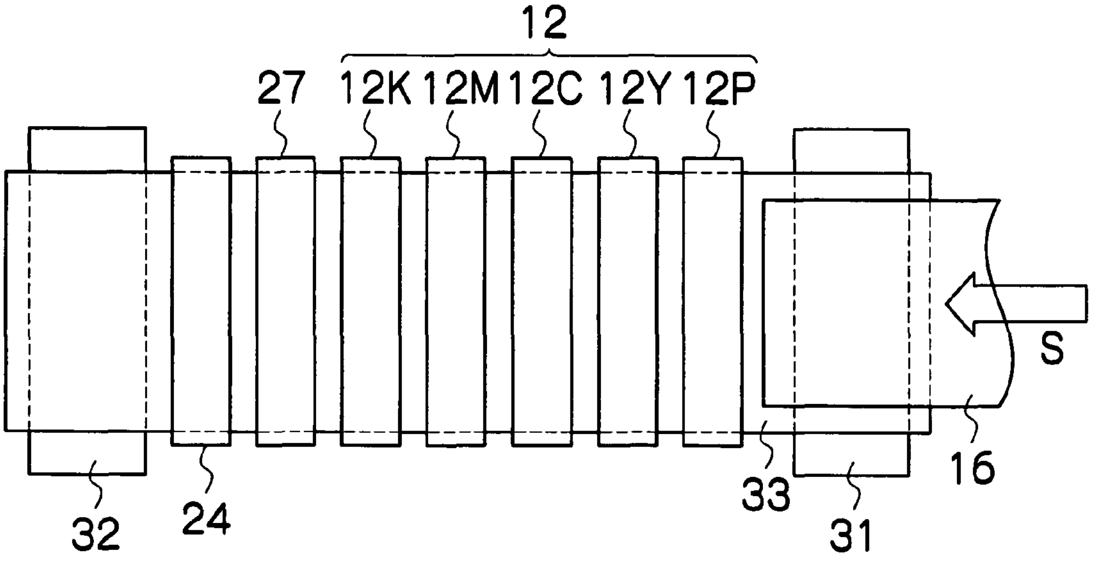
FIG. 3 is a plan diagram showing a liquid application unit in the image forming apparatus and the peripheral region of same.

FIG. 3 shows a plan diagram of the liquid application unit 12 of the image forming apparatus 10 and the peripheral region of same.

In FIG. 3, the liquid application unit 12 includes a droplet ejection head 12P for the first liquid, which ejects droplets of the first liquid onto the recording medium 16 in a single pass, and droplet ejection heads 12Y, 12C, 12M and 12K for the inks, which eject droplets of the inks onto the recording medium 16 in a single pass. More specifically, the liquid application unit 12 includes so-called full line heads, which are the line heads of a length corresponding to the full width of the recordable area of the recording medium 16 disposed in a direction (main scanning direction) that is perpendicular to the conveyance direction of the medium (the sub-scanning direction indicated by the arrow S in FIG. 3).

The droplet ejection heads 12P, 12Y, 12C, 12M and 12K of the present embodiment each have a plurality of nozzles (liquid ejection ports) arranged through a length exceeding at least one edge of the maximum-size recording medium 16 intended for use with the image recording apparatus 10.

Furthermore, the droplet ejection heads 12P, 12Y, 12C, 12M and 12K corresponding to the respective liquids are disposed in the sequence of: first liquid (P), yellow ink (Y), cyan ink (C), magenta ink (M) and black ink (K), from the upstream side (the right-hand side in FIG. 3), following the medium conveyance direction S, and hence a color image can be formed on the recording medium 16.

More specifically, firstly, the first liquid is deposited on the recording medium 16 by ejecting droplets of the first liquid onto the recording medium 16 from the first droplet ejection head 12P, and subsequently, droplets of the second liquids (inks) are ejected respectively from the ink droplet ejection heads 12Y, 12M, 12C and 12K, onto the recording medium 16, in the region where the first liquid is present in the form of the liquid film. Here, since the ink droplets are submerged into the liquid film composed of the first liquid on the recording medium 16, then no new air/liquid interface is created and hence depositing interference is avoided.

Furthermore, if using the liquid application unit 12 constituted by the full line droplet ejection heads, it is possible to record an image onto the whole surface of the recording medium 16, simply by performing one operation of moving the recording medium 16 and the liquid application unit 12 relatively to each other in the medium conveyance direction (sub-scanning direction). Higher-speed printing is thereby made possible and productivity can be improved in comparison with a shuttle type head configuration in which a droplet ejection head moves reciprocally in a direction (main scanning direction) which is perpendicular to the medium conveyance direction (sub-scanning direction).

The terms main scanning direction and sub-scanning direction are used in the following senses. More specifically, in a full-line head comprising rows of nozzles that have a length corresponding to the entire width of the recording medium, "main scanning" is defined as printing one line (a line formed of a row of dots, or a line formed of a plurality of rows of dots) in the breadthways direction of the recording medium (the direction perpendicular to the conveyance direction of the recording medium) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while moving the full-line head and the recording medium relatively to each other. The direction in which sub-scanning is performed is called the sub-scanning direction. Consequently, the conveyance direction of the recording medium is the sub-scanning direction and the direction perpendicular to same is called the main scanning direction.

Although a configuration with the four standard colors, Y M C and K, is described in the present embodiment, the combinations of the ink colors and the number of colors are not limited to the examples described in the present embodiment, and light and/or dark inks, and background color inks, can be added as required. For example, a configuration is possible in which droplet ejection heads for ejecting light-colored inks such as light cyan and light magenta, or a head for ejecting white ink, are added.

The UV light source 27 radiates ultraviolet light toward the recording medium 16. For an ultraviolet lamp in the UV light source 27, it is possible to use a high-voltage mercury lamp, a metal halide lamp, an ultraviolet LED (light emitting diode), an LD (laser diode), or the like. If using a radical polymerizable monomer in the first liquid and/or the inks, it is also preferable to provide the UV light source 27 with a nitrogen blanket in order to shield out the oxygen from the curing processing unit.

The liquid storing and loading unit 14 shown in FIG. 2 has a first liquid tank, which stores the first liquid, and ink tanks, which store the inks separately for the colors of Y, M, C and K, and the tanks are connected respectively to the droplet ejection heads 12P, 12Y, 12C, 12M and 12K, through tubing channels (not shown).

The image determination unit 24 has an image sensor (line sensor, or the like) for capturing an image of the droplet ejection result of the liquid application unit 12, and functions as a device to check for ejection abnormalities, such as blockages of the nozzles in the liquid application unit 12 on the basis of the image read in by the image sensor.

The recording medium 16 forming a print on which an image has been formed is output from the paper output unit 26. In the image forming apparatus 10, a sorting device (not shown) is provided for switching the outputting pathway in order to sort the printed matter bearing the target print and the printed matter bearing the test print, and to send them to output units 26A and 26B, respectively. If the main image and the test print are formed simultaneously in a parallel fashion, on a large piece of printing paper, then the portion corresponding to the test print is cut off by means of the cutter (second cutter) 48. The cutter 48 is disposed immediately in front of the paper output section 26, and serves to cut and separate the main image from the test print section, in cases where a test image is printed onto the white margin of the image. Moreover, although omitted from the drawing, a sorter for collating and stacking the images according to job orders is provided in the paper output section 26A corresponding to the main images.

Structure of the Droplet Ejection Head

Figure 4A:
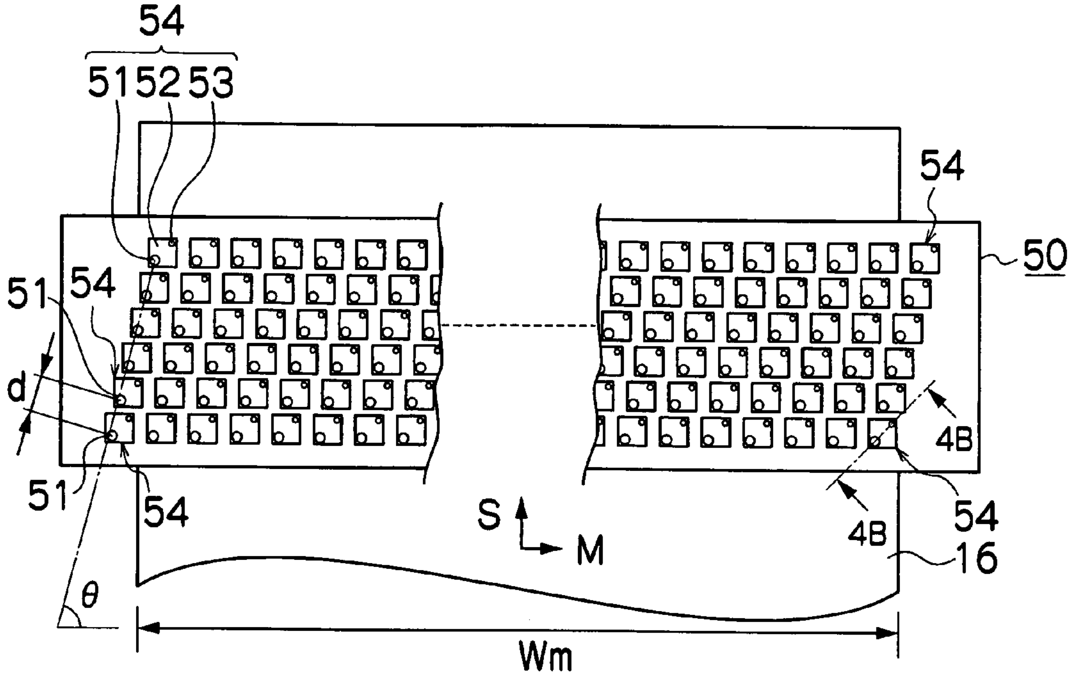
FIG. 4A is a plan view perspective diagram showing the overall structure of a droplet ejection head in the image forming apparatus.

FIG. 4A is a plan view perspective diagram showing one of the droplet ejection heads in the image forming apparatus 10, where the droplet ejection head is taken as a representative example of the droplet ejection heads 12P, 12Y, 12C, 12M and 12K shown in FIG. 3 and is denoted with reference numeral 50.

The droplet ejection head 50 shown in FIG. 4A is a so-called full line head, having a structure in which a plurality of nozzles 51 (liquid ejection ports) which eject liquid toward the recording medium 16 are arranged in a two-dimensional configuration through a length corresponding to the width Wm of the recording medium 16 in the direction perpendicular to the direction of conveyance of the recording medium 16 (the sub-scanning direction indicated by arrow S in FIG. 4A), in other words, in the main scanning direction indicated by arrow M in FIG. 4A.

The droplet ejection head 50 includes a plurality of pressure chamber units 54, each having the nozzle 51, a pressure chamber 52 connected to the nozzle 51, and a liquid supply port 53. The pressure chamber units 54 are arranged in two directions, namely, the main scanning direction M and an oblique direction forming a prescribed acute angle θ (where $0° < θ < 90°$) with respect to the main scanning direction M. In FIG. 4A, in order to simplify the drawing, only a portion of the pressure chamber units 54 are depicted in the drawing.

In specific terms, the nozzles 51 are arranged at a uniform pitch d in the direction forming the prescribed acute angle of θ with respect to the main scanning direction M, and hence the nozzle arrangement can be treated as equivalent to a configuration in which the nozzles are arranged at an interval of $d \times \cos θ$ in a single straight line following the main scanning direction M.

Figure 4B:
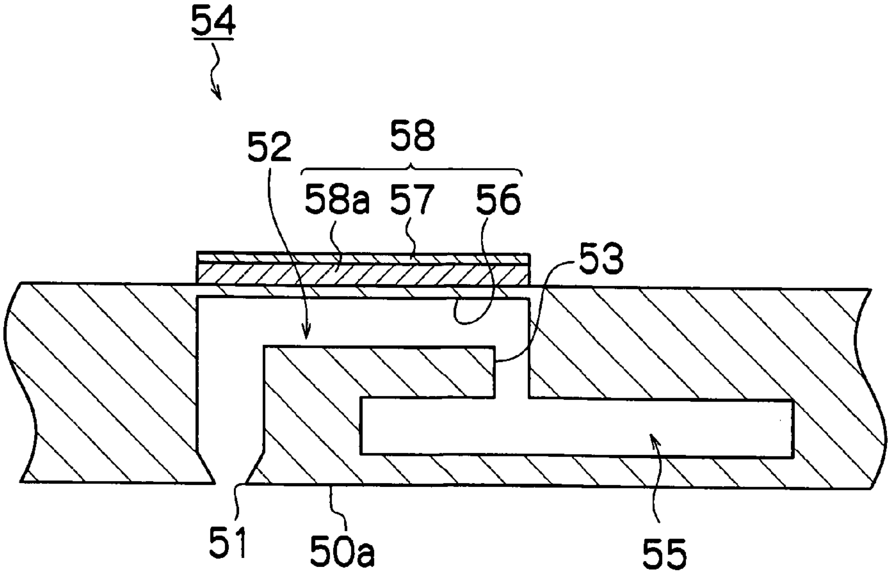
FIG. 4B is a cross-sectional diagram along line 4B-4B in FIG. 4A.

FIG. 4B shows a cross-sectional diagram along line 4B-4B in FIG. 4A of one of the aforementioned pressure chamber units 54, which forms one of the ejection elements constituting the droplet ejection head 50.

As shown in FIG. 4B, each pressure chamber 52 is connected to a common liquid chamber 55 through the liquid supply port 53. The common liquid chamber 55 is connected to a tank, which forms a liquid supply tank (not illustrated), and the liquid supplied from the tank is distributed and supplied to the respective pressure chambers 52 by means of the common liquid chamber 55.

A piezoelectric body 58*a* is disposed on top of a diaphragm 56, which constitutes the ceiling of the pressure chamber 52, and an individual electrode 57 is provided on top of this piezoelectric body 58*a*. The diaphragm 56 is earthed and also functions as a common electrode. A piezoelectric actuator 58, which forms a device for generating a liquid ejection force, is constituted by the diaphragm 56, the individual electrode 57 and the piezoelectric body 58*a*.

When a prescribed drive voltage is applied to the individual electrode 57 of the piezoelectric actuator 58, the piezoelectric body 58*a* deforms, thereby changing the volume of the pressure chamber 52, and this results in a change in the pressure inside the pressure chamber 52, which causes liquid to be ejected from the nozzle 51. When the volume of the pressure chamber 52 returns to normal after ejection of liquid, new liquid is supplied to the pressure chamber 52 from the common liquid chamber 55 via the liquid supply port 53.

FIG. 4A shows an example where the plurality of nozzles 51 are arranged two-dimensionally in order to achieve a structure whereby a high-resolution image can be formed at high-speed onto the recording medium 16, but the droplet ejection head according to the present invention is not limited in particular to the structure in which the plurality of nozzles 51 are arranged two-dimensionally, and it may also adopt a structure where a plurality of nozzles 51 are arranged one-dimensionally. Furthermore, the pressure chamber unit 54 shown in FIG. 4B is merely an example of the ejection element constituting a part of the droplet ejection head and the invention is not limited in particular to this case. For example, instead of disposing the common liquid chamber 55 below the pressure chambers 52 (in other words, between an ejection face 50*a* and the pressure chambers 52), it is also possible to dispose the common liquid chamber 55 above the pressure chambers 52 (in other words, on the side of the pressure chambers 52 reverse to the side facing to the ejection face 50*a*). Furthermore, it is also possible to generate a liquid ejection force by using heating bodies instead of piezoelectric bodies 58*a*, for example.

In the present invention, as the device for applying the first liquid onto the recording medium, it is possible to use another application device, rather than one based on ejecting the first liquid from the nozzles.

There are no particular restrictions on the application device, and it is possible to select a commonly known application device, according to the required objective. Possible examples of such a device include: an air doctor coater, a blade coater, a lot coater, a knife coater, a squeeze coater, an immersion coater, a reverse roll coater, a transfer roll coater, a gravure coater, a kiss roll coater, a cast coater, a spray coater, a curtain coater, an extrusion coater, or the like.

Description of Liquid Supply System

Figure 5:
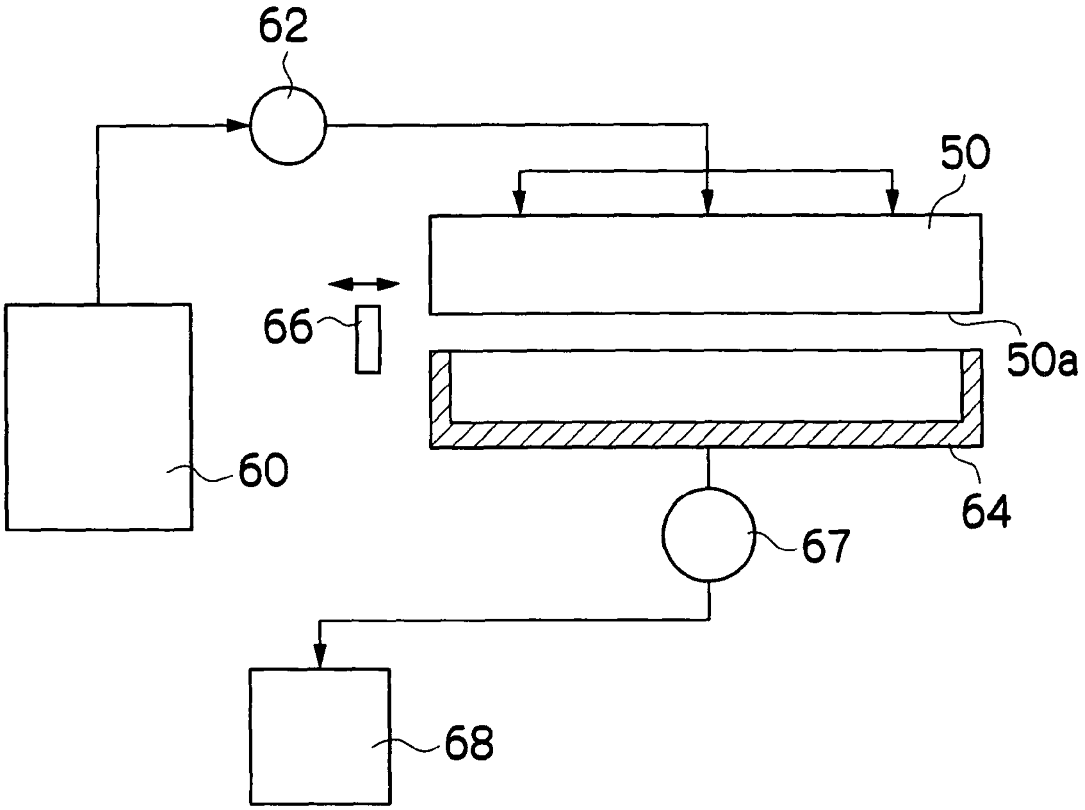
FIG. 5 is a principal compositional diagram showing a liquid supply system in the image forming apparatus.

FIG. 5 is a conceptual diagram showing the composition of a liquid supply system in the image forming apparatus 10.

The liquid tank 60 is a base tank for supplying the liquid to the droplet ejection head 50. A supply pump 62, which sends the liquid from the liquid tank 60 to the droplet ejection head 50, is provided at an intermediate point of the tubing channel that connects the liquid tank 60 with the droplet ejection head 50.

Furthermore, the image forming apparatus 10 includes: a cap 64 forming a device for preventing drying of the liquid surfaces in the nozzles 51 or preventing increase in the ink viscosity in the vicinity of the liquid surfaces in the nozzles 51 during a prolonged idle period without ejection; and a cleaning blade 66 forming a device for cleaning the ejection face 50*a*.

A maintenance unit including the cap 64 and the cleaning blade 66 can be moved in a relative fashion with respect to the droplet ejection head 50 by a movement mechanism (not shown), and is moved from a predetermined holding position to a maintenance position below the droplet ejection head 50, as and when required.

Furthermore, the cap 64 is raised and lowered in a relative fashion with respect to the droplet ejection head 50 by an elevator mechanism (not shown). The elevator mechanism raises the cap 64 to a predetermined elevated position so as to come into close contact with the droplet ejection head 50, and at least the nozzle region of the nozzle surface 50*a* is thus covered by the cap 64.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

The cleaning blade 66 is composed of rubber or another elastic member, and can slide on the ejection face 50*a* of the droplet ejection head 50 by means of a cleaning blade movement mechanism (not shown). If droplets or foreign matter have become attached to the ejection face 50*a*, then the ejection face 50*a* is wiped by sliding the cleaning blade 66 over the ejection face 50*a*, in such a manner that the ejection face 50*a* is cleaned.

In a state where the ejection face 50*a* of the droplet ejection head 50 is covered by the cap 64, a suction pump 67 suctions the liquid from the nozzles 51 of the droplet ejection head 50 and sends the suctioned liquid to a recovery tank 68.

A suction operation of this kind is carried out when the liquid is filled into the droplet ejection head 50 from the liquid tank 60 when the liquid tank 60 is installed in the image forming apparatus 10 (initial filling), and it is also carried out when removing liquid of increased viscosity after the apparatus has been out of use for a long period of time (start of use after long period of inactivity).

Here, to categorize the types of ejection performed from the nozzles 51, there is, firstly, normal ejection performed onto the recording medium in order to form an image on the recording medium, such as paper, and secondly, purging (also called dummy ejection) performed onto the cap 64, using the cap 64 as an ink receptacle.

Furthermore, if air bubbles infiltrate inside the nozzles 51 and the pressure chambers 52 of the droplet ejection head 50, or if the increase in the viscosity of the ink inside the nozzles 51 exceeds a certain level, then it becomes impossible to eject the liquid from the nozzles 51 in the aforementioned dummy ejection operation, and therefore, the cap 64 is abutted against the ejection face 50*a* of the droplet ejection head 50, and an operation is performed to suction out the liquid containing air bubbles or the liquid of increased viscosity inside the pressure chambers 52 of the droplet ejection head 50, by means of the suction pump 67.

For the member used for liquid supply and cleaning, a material is selected that is not corroded with the first liquid or the inks used, even if it makes contact with same.

Description of Control System

Figure 6:
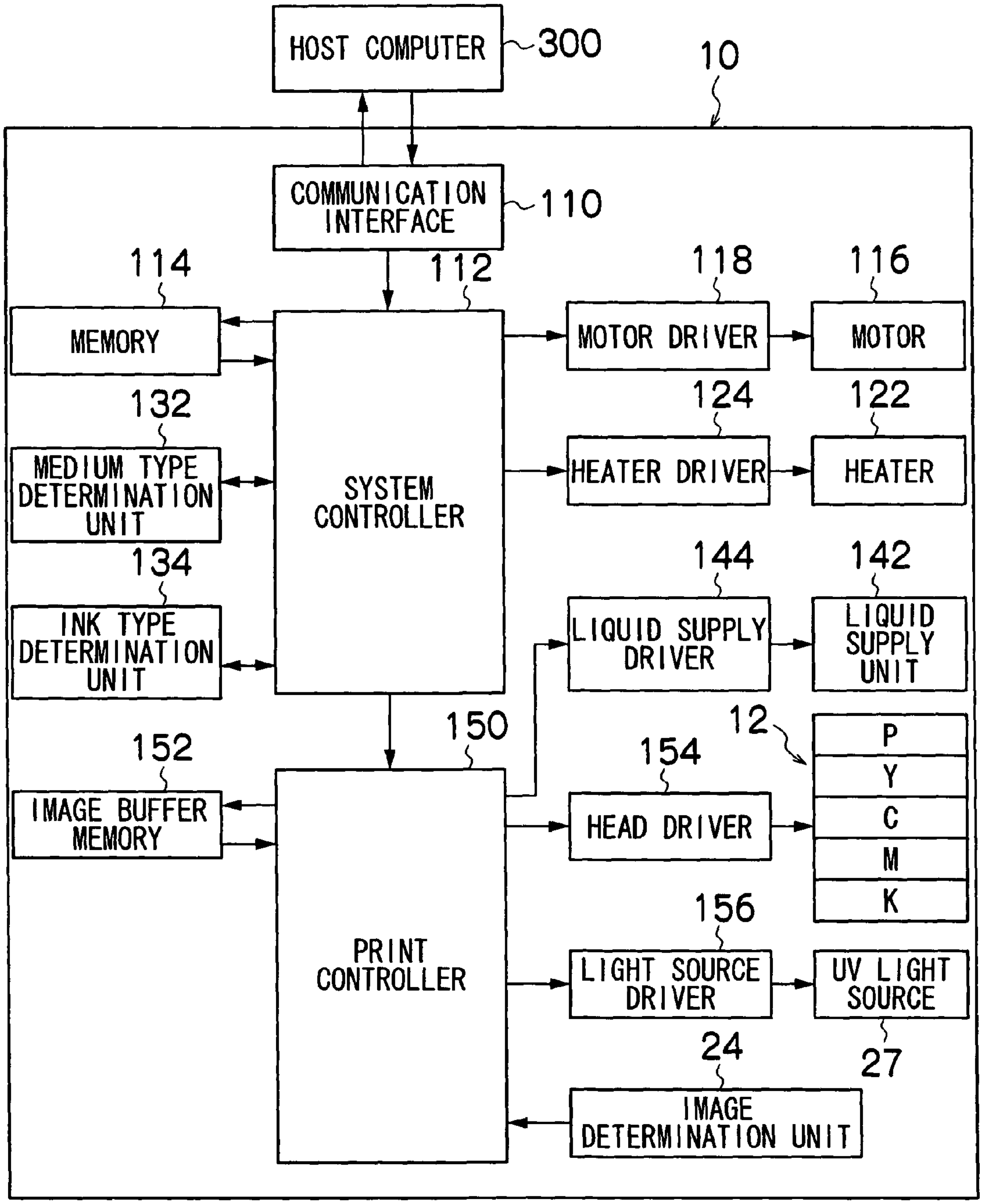
FIG. 6 is a system composition diagram used to describe a control system in the image forming apparatus.
Figure 15:
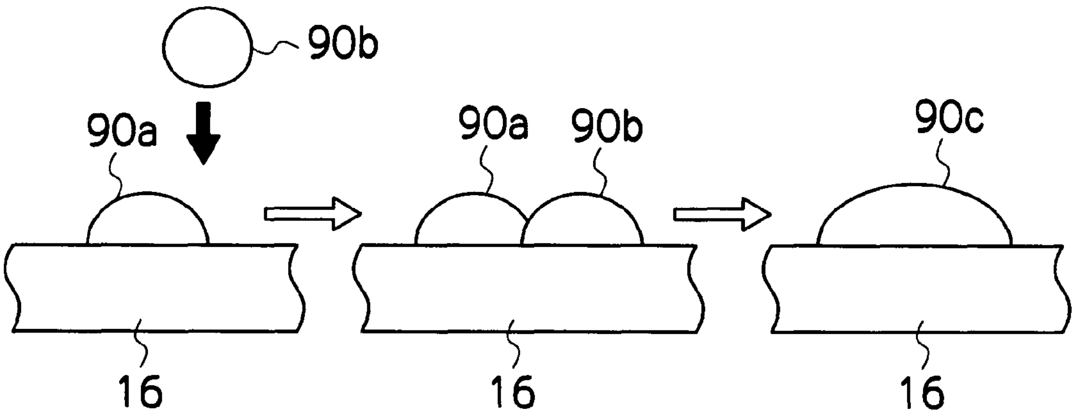
FIG.15 RELATED ART
FIG. 15 is a schematic drawing used to describe the depositing interference in the related art.

FIG. 6 is a principal block diagram showing the system composition of the inkjet recording apparatus 10.

In FIG. 6, the image forming apparatus 10 includes: the liquid application unit 12, the image determination unit 24, the UV light source 27, a communication interface 110, a system controller 112, memories 114 and 152, a conveyance motor 116, a motor driver 118, a heater 122, a heater driver 124, a medium type determination unit 132, an ink type determination unit 134, a liquid supply unit 142, a liquid supply driver 144, a print controller 150, a head driver 154, and a light source driver 156.

Since the liquid application unit 12, the image determination unit 24 and the UV light source 27 are the same as those described in FIG. 2, and have been described already, then further description thereof is omitted here.

The communication interface 110 is an image data input device for receiving image data transmitted from a host computer 300. For the communication interface 110, a wired or wireless interface, such as a USB (Universal Serial Bus), IEEE 1394, or the like, can be used. The image data input to the image forming apparatus 110 through the communication interface 110 is stored temporarily in the first memory 114 for storing image data.

The system controller 112 is constituted by a central processing unit (CPU) and peripheral circuits thereof, and the like, and it forms a main control device which controls the whole of the image forming apparatus 10 in accordance with a prescribed program stored previously in the first memory 114. More specifically, the system controller 112 controls the respective units of the communication interface 110, the motor driver 118, the heater driver 124, the medium type determination unit 132, the ink type determination unit 134, the print controller 150, and the like.

The conveyance motor 116 supplies a motive force to the roller and belt, and the like, in order to convey the recording medium, such as the paper. The droplet ejection heads 50 constituting the liquid application unit 12, and the recording medium, are moved relatively to each other by means of the conveyance motor 116. The motor driver 118 is a circuit which drives the conveyance motor 116 in accordance with instructions from the system controller 112.

The heater driver 124 is a circuit which drives the heater 122 in the heating drum 30 in FIG. 2 and other heaters 122, in accordance with instructions from the system controller 112.

The medium type determination unit 132 determines the type of the recording medium. There are various possible modes for determining the recording medium. For example, there is a mode where the medium type is determined by providing a sensor in the paper supply unit 18 in FIG. 2, a mode where it is input by an operation performed by the user, a mode where it is input from the host computer 300, and a mode where it is determined automatically by analyzing the image data input from a host computer 300 (for example, the resolution and color) or the additional data of the image data.

The ink type determination unit 134 determines the type of the ink. There are various possible modes for determining the type of ink. For example, there is a mode where the ink type is determined by providing a sensor in the liquid storing and loading unit 14 in FIG. 2, a mode where it is input by an operation by the user, a mode where it is input from the host computer 300, and a mode where it is determined automatically by analyzing the image data input from the host computer 300 (for example, the resolution and color) or the additional data of the image data.

The liquid supply unit 142 is constituted by a tubing channel and a liquid supply pump 62, and the like, whereby the ink is caused to flow from the liquid tank 60 in FIG. 5 to the liquid application unit 12.

The liquid supply driver 144 is a circuit which drives the liquid supply pump 62, and the like, constituting the liquid supply unit 142, in such a manner that the liquid is supplied to the liquid application unit 12.

The print controller 150 generates data (droplet ejection data) required in order to perform ejection (deposition) onto the recording medium from the respective droplet ejection heads 50 which constitute the liquid application unit 12, on the basis of the image data input to the image recording apparatus 10. More specifically, the print controller 150 is a control unit which functions as an image processing device that carries out various image treatment processes, corrections, and the like, in accordance with the control implemented by the system controller 112, in order to generate droplet ejection data, from the image data stored in the first memory 114, and it supplies the droplet ejection data thus generated to the head driver 154.

Furthermore, the print controller 150 decides the thickness of the liquid film to be formed on the recording medium by the first liquid, on the basis of the medium type determined by the medium type determination unit 132 and the ink type determined by the ink type determination unit 134, and it adjusts the thickness of the liquid film by controlling the droplet ejection volume of the first liquid by means of the head driver 154.

The second memory or an image buffer memory 152 is appended to the print controller 150, and droplet ejection data, and the like, is stored temporarily in the second memory 152 during image processing by the print controller 150.

In FIG. 6, the second memory 152 is depicted as being appended to the print controller 150; however, it may also be combined with the first memory 114. Also possible is a mode in which the print controller 150 and the system controller 112 are integrated to form a single processor.

The head driver 154 outputs ejection drive signals to the respective droplet ejection heads 50 constituting the liquid application unit 12, on the basis of the droplet ejection data supplied from the print controller 150 (in practice, the droplet ejection data stored in the second memory 152). By supplying the ejection drive signals output from the head driver 154 to the respective droplet ejection heads 50 (more specifically, to the actuators 58 shown in FIG. 4B), the liquid (in the form of droplets) is ejected from the droplet ejection heads 50 toward the recording medium.

The light source driver 156 is a circuit which drives the UV light source 27 in accordance with instructions from the print controller 150.

Substances Contained in Liquid

The substances contained in the liquid applied on the recording medium by the liquid application unit 12 are described in detail below.

The image forming apparatus shown in the present embodiment uses a liquid containing one or more of substances selected from: a polymerizable compound (a radiation-curable "monomer" or "pre-polymer"), a polymerization initiator (also called a "curing initiator"), a coloring material (also called a "coloring agent"), a dispersion inhibitor, and a high-boiling-point solvent (more specifically, an oil).

Polymerizable Compound

The polymerizable compound in the present invention has a curing function by generating a polymerization or bridging reaction by means of initiators, such as radicals generated from the polymerization initiator, or the like, described below.

The polymerizable compound used in the present invention may be a commonly known polymerizable compound using a radical polymerization reaction, a cationic polymerization reaction, a dimerization reaction, or the like (below, these are referred to jointly as "polymerizable material").

The polymerizable compound used in the present invention is not limited to a particular compound, provided that the polymerizable compound is cured by producing a polymerization reaction due to application of energy of some kind, and it is possible to use monomer, oligomer or polymer species. However, it is particularly desirable to use a commonly known polymerizable monomer, such as a cationically polymerizable monomer or a radically polymerizable monomer, which generates a polymerization reaction by means of initiators generated from a polymerization initiator, which is added as desired.

It is also possible to use one or more of polymerizable compounds for the purpose of adjusting the reaction speed, the ink properties and the properties of the cured film, and the like. Furthermore, the polymerizable compound may be a monofunctional compound or a polyfunctional compound.

Cationically Polymerizable Monomer

Possible examples of a light-induced cationically polymerizable monomer usable as the polymerizable compound in the present invention are an epoxy compound, a vinyl ether compound, an oxetane compound, or the like, as described in Japanese Patent Application Publication No. 6-9714, Japanese Patent Application Publication No. 2001-31892, Japanese Patent Application Publication No. 2001-40068, Japanese Patent Application Publication No. 2001-55507, Japanese Patent Application Publication No. 2001-310938, Japanese Patent Application Publication No. 2001-310937, Japanese Patent Application Publication No. 2001-220526, and the like.

Possible examples of the epoxy compound are: an aromatic epoxide, an alicyclic epoxide, and the like.

As examples of a monofunctional epoxy compound usable in the present invention, it is possible to cite: phenyl glycidyl ether, p-tert-butyl phenyl glycidyl ether, butyl glycidyl ether, 2-ethyl hexyl glycidyl ether, allyl glycidyl ether, 1,2-butylene oxide, 1,3-butadiene monoxide, 1,2-epoxide decane, epichlorohydrin, 1,2-epoxydecane, styrene oxide, cyclohexane oxide, 3-methacryloyl oxymethyl cyclohexane oxide, 3-acryloyl oxymethyl cyclohexane oxide, 3-vinyl cyclohexene oxide, and the like.

As examples of the polyfunctional epoxy compound usable in the present invention, it is possible to cite: bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, an epoxy novolak resin, hydrogenated bisphenol A diglycidyl ether, hydrogenated bisphenol F diglycidyl ether, hydrogenated bisphenol S diglycidyl ether, 3,4-epoxy cyclohexyl methyl-3',4'-epoxy cyclohexane carboxylate, 2-(3,4-epoxy cyclohexyl-5,5-spiro-3,4-epoxy) cyclohexane-meta-dioxane, bis(3,4-epoxy cyclohexyl methyl)adipate, vinyl cyclohexene oxide, 4-vinyl epoxy cyclohexane, bis(3,4-epoxy-6-methyl cyclohexyl methyl)adipate, 3,4-epoxy-6-methyl cyclohexyl-3',4'-epoxy-6'-methyl cyclo-hexane carboxylate, methylene-bis(3,4-epoxy cyclohexane), dicyclopentadiene diepoxide, a di(3,4-epoxy cyclohexyl methyl)ether of ethylene glycol, ethylene bis(3,4-epoxy cyclohexane carboxylate), dioctyl epoxy hexahydrophthalate, di-2-ethylhexyl epoxy hexahydrophthalate, 1,4-butane diol diglycidyl ether, 1,6-hexane diol diglycidyl ether, glycerine triglycidyl ether, trimethylol propane triglycidyl ether, polyethylene glycol diglycidyl ether, a polypropylene glycol diglycidyl ether, 1,1,3-tetradecadiene dioxide, limonene dioxide, 1,2,7,8-diepoxy octane, 1,2,5,6-diepoxy cyclooctane, 1-methyl-4-(2-methyl oxiranyl)-7-oxabicyclo [4.1.0]heptane, or the like.

Of these epoxy compounds, aromatic epoxides and alicyclic epoxides are desirable in view of their excellent curing speeds, and alicyclic epoxides are particularly desirable.

As examples of a monofunctional vinyl ether usable in the present invention, it is possible to cite: methyl vinyl ether, ethyl vinyl ether, propyl vinyl ether, n-butyl vinyl ether, t-butyl vinyl ether, 2-ethyl hexyl vinyl ether, n-nonyl vinyl ether, lauryl vinyl ether, cyclohexyl vinyl ether, cyclohexyl methyl vinyl ether, 4-methyl cyclohexyl methyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxy ethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, and the like.

As examples of a polyfunctional vinyl ether usable in the present invention, it is possible to cite: divinyl ethers, such as ethylene glycol vinyl ether, diethylene glycol vinyl ether, polyethylene glycol divinyl ether, propylene glycol divinyl ether, butylene glycol divinyl ether, hexane diol divinyl ether, bisphenol A alkylene oxide divinyl ether, bisphenol F alkylene oxide divinyl ether, or the like; or trimethylol ethane trivinyl ether, trimethylol propane trivinyl ether, ditrimethylol propane tetravinyl ether, glycerine trivinyl ether, pentaerythritol tetravinyl ether, dipentaerythritol pentavinyl ether, dipentaerythritol hexavinyl ether, an ethylene oxide adduct of trimethylol propane trivinyl ether, a propylene oxide adduct of trimethylol propane trivinyl ether, an ethylene oxide adduct of ditrimethylol propane tetravinyl ether, a propylene oxide adduct of ditrimethylol propane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, a propylene oxide adduct of dipentaerythritol hexavinyl ether, or the like.

From the viewpoint of curability, adhesion to the recording medium, and the surface hardness of the formed image, the vinyl ether compound is desirably a di-vinyl ether compound or tri-vinyl ether compound, and a di-vinyl ether compound is especially desirable.

The oxetane compound used in the present invention includes a compound containing an oxetane ring, and a commonly known oxetane compound, such as those described in Japanese Patent Application Publication No. 2001-220526, Japanese Patent Application Publication No. 2001-310937, Japanese Patent Application Publication No. 2003-341217, and the like, may be used.

Desirably, the compound having an oxetane ring which is contained in the ink composition used for carrying out the present invention is a compound having 1 to 4 oxetane rings in its structure. By using a compound of this kind, the viscosity of the ink composition can be maintained easily within a range that is suitable for handling, as well as obtaining good adhesiveness of the ink to the recording medium after curing.

As examples of a monofunctional oxetane compound usable in the present invention, it is possible to cite: 3-ethyl-3-hydroxymethyl oxetane, 3-(meta)allyloxymethyl-3-ethyloxetane, (3-ethyl-3-oxetanyl methoxy)methyl benzene, 4-fluoro-[1-(3-ethyl-3-oxetanyl methoxy)methyl]benzene, 4-methoxy-[1-(3-ethyl-3-oxetanyl methoxy)methyl]benzene, [1-(3-ethyl-3-oxetanyl methoxy)ethyl]phenyl ether, isobutoxymethyl (3-ethyl-3-oxetanyl methyl)ether, isobornyl oxyethyl (3-ethyl-3-oxetanyl methyl)ether, isobornyl (3-ethyl-3-oxetanyl methyl)ether, 2-ethyl hexyl (3-ethyl-3-oxetanyl methyl)ether, ethyl diethylene glycol(3-ethyl-3-oxetanyl methyl)ether, dicyclopentadiene (3-ethyl-3-oxetanyl methyl)ether, dicyclopentenyl oxyethyl(3-ethyl-3-oxetanyl methyl)ether, dicyclopentenyl (3-ethyl-3-oxetanyl methyl) ether, tetrahydrofurfuryl(3-ethyl-3-oxetanyl methyl)ether, tetrabromophenyl(3-ethyl-3-oxetanyl methyl)ether, 2-tetrabromophenoxyethyl (3-ethyl-3-oxetanyl methyl)ether, tribromophenyl(3-ethyl-3-oxetanyl methyl)ether, 2-tribromophenoxyethyl(3-ethyl-3-oxetanyl methyl)ether, 2-hydroxyethyl (3-ethyl-3-oxetanyl methyl)ether, 2-hydroxypropyl (3-ethyl-3-oxetanyl methyl)ether, butoxyethyl(3-ethyl-3-oxetanyl methyl)ether, pentachlorophenyl(3-ethyl-3-oxetanyl methyl)ether, pentabromophenyl(3-ethyl-3-oxetanyl methyl)ether, bornyl(3-ethyl-3-oxetanyl methyl) ether, or the like.

As examples of a polyfunctional oxetane usable in the present invention, it is possible to cite: 3,7-bis(3-oxetanyl)-5-oxa-nonane, 3,3'-(1,3-(2-methylenyl)propane diylbis (oxymethylene))bis-(3-ethyl oxetane), 1,4-bis[(3-ethyl-3-oxetanyl methoxy)methyl]benzene, 1,2-bis[(3-ethyl-3-oxetanyl methoxy)methyl]ethane, 1,3-bis[(3-ethyl-3-oxetanyl methoxy)methyl]propane, bis{[1-ethyl (3-oxetanil)]methyl}ether, ethylene glycol bis(3-ethyl-3-oxetanyl methyl)ether, dicyclopentenyl bis(3-ethyl-3-oxetanyl methyl)ether, triethylene glycol bis(3-ethyl-3-oxetanyl methyl)ether, tetraethylene glycol bis(3-ethyl-3-oxetanyl methyl) ether, tricyclodecane diyl dimethylene (3-ethyl-3-oxetanyl methyl)ether, trimethylol propane tris(3-ethyl-3-oxetanyl methyl)ether, 1,4-bis[(3-ethyl-3-oxetanyl methoxy)]butane, 1,6-bis(3-ethyl-3-oxetanyl methoxy)hexane, pentaerythritol tris(3-ethyl-3-oxetanyl methyl)ether, pentaerythritol tetrakis (3-ethyl-3-oxetanyl methyl)ether, polyethylene glycol bis(3-ethyl-3-oxetanyl methyl)ether, dipentaerythritol hexakis(3-ethyl-3-oxetanyl methyl)ether, dipentaerythritol pentakis(3-ethyl-3-oxetanyl methyl)ether, dipentaerythritol tetrakis(3-ethyl-3-oxetanyl methyl)ether, caprolactone-modified dipentaerythritol hexakis(3-ethyl-3-oxetanyl methyl)ether, caprolactone-modified dipentaerythritol pentakis(3-ethyl-3-oxetanyl methyl)ether, ditrimethylol propane tetrakis(3-ethyl-3-oxetanyl methyl)ether, EO-modified bisphenol A bis (3-ethyl-3-oxetanyl methyl)ether, PO-modified bisphenol A bis(3-ethyl-3-oxetanyl methyl)ether, EO-modified hydrogenated bisphenol A bis(3-ethyl-3-oxetanyl methyl)ether, PO-modified hydrogenated bisphenol A bis(3-ethyl-3-oxetanyl methyl)ether, EO-modified bisphenol F (3-ethyl-3-oxetanyl methyl)ether, and the like.

For the compound having oxetane rings of this kind, it is suitable to use the compounds described in detail in paragraphs (0021) to (0084) of Japanese Patent Application Publication No. 2003-341217.

Of the oxetane compounds used in the present invention, it is desirable to use a compound having one to two oxetane rings from the viewpoint of the viscosity and the adhesiveness of the ink composition.

In the ink composition used for carrying out the present invention, it is possible to use only one type of these polymerizable compounds or two or more types of these polymerizable compounds. From the viewpoint of effectively suppressing contraction in curing of the ink, it is desirable to combine the use of at least one type of oxetane compound, and at least one type of compound selected from epoxy compounds and vinyl ether compounds.

Radically Polymerizable Monomer

Various commonly known radically polymerizable monomers which produce a polymerization reaction due to initiators generated from a photo-radical initiator can be used preferably as a polymerizable compound in the present invention.

Examples of the radically polymerizable monomer usable in the present invention are: a (meth)acrylate, a (meth)acrylamide, an aromatic vinyl, or the like. In the present specification, the term "(meth)acrylate" indicates "acrylate" and/or "methacrylate", and the term "(meth)acryl" indicates "acryl" and/or "methacryl".

Examples of (meth)acrylates usable in the present invention include the following, for instance.

Examples of a monofunctional (meth)acrylate are: a hexyl (meth)acrylate, 2-ethyl hexyl(meth)acrylate, tert-octyl(meth) acrylate, isoamyl(meth)acrylate, decyl(meth)acrylate, isodecyl(meth)acrylate, stearyl(meth)acrylate, isostearyl(meth) acrylate, cyclohexyl(meth)acrylate, 4-n-butyl cyclohexyl (meth)acrylate, bornyl(meth)acrylate, isobornyl(meth) acrylate, benzyl(meth)acrylate, 2-ethyhexyl diglycol (meth) acrylate, butoxyethyl(meth)acrylate, 2-chloroethyl(meth) acrylate, 4-bromobutyl(meth)acrylate, cyanoethyl(meth) acrylate, benzyl(meth)acrylate, butoxymethyl(meth) acrylate, 3-methoxybutyl(meth)acrylate, alkoxymethyl (meth)acrylate, alkoxyethyl(meth)acrylate, 2-(2-methoxyethoxy)ethyl(meth)acrylate, 2-(2-butoxyethoxy) ethyl(meth)acrylate, 2,2,2-tetrafluoroethyl(meth)acrylate, 1H, 1H,2H,2H perfluorodecyl(meth)acrylate, 4-butyl phenyl (meth)acrylate, phenyl(meth)acrylate, 2,4,5-tetramethyl phenyl(meth)acrylate, 4-chlorophenyl(meth)acrylate, phenoxymethyl(meth)acrylate, phenoxyethyl(meth)acrylate, glycidyl(meth)acrylate, glycidyl oxybutyl(meth)acrylate, glycidyl oxyethyl(meth)acrylate, glycidyl oxypropyl(meth) acrylate, tetrahydrofurfuryl(meth)acrylate, hydroxyalkyl (meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, dimethyl aminoethyl (meth)acrylate, diethyl aminoethyl(meth)acrylate, dimethyl aminopropyl(meth)acrylate, diethyl aminopropyl(meth) acrylate, trimethoxysilyl propyl(meth)acrylate, trimethylsilyl propyl(meth)acrylate, polyethylene oxide monomethyl ether (meth)acrylate, oligo-ethylene oxide monomethyl ether (meth)acrylate, polyethylene oxide (meth)acrylate, oligo-ethylene oxide (meth)acrylate, oligo-ethylene oxide monoalkyl ether (meth)acrylate, polyethylene oxide monoalkyl ether (meth)acrylate, dipropylene glycol (meth) acrylate, polypropylene oxide monoalkyl ether (meth)acrylate, oligo-propylene oxide monoalkyl ether (meth)acrylate, 2-methacryloyloxy ethyl succinate, 2-methacryloyloxy hexahydro phthalate, 2-methacryloyloxy ethyl 2-hydroxypropyl phthalate, butoxy diethylene glycol (meth)acrylate, trifluoroethyl (meth)acrylate, perfluoro octylethyl(meth) acrylate, 2-hydroxy-3-phenoxy propyl (meth)acrylate, EO-modified phenol (meth)acrylate, EO-modified cresol (meth) acrylate, EO-modified nonyl phenol (meth)acrylate, PO-modified nonyl phenol (meth)acrylate, EO-modified 2-ethyl hexyl(meth)acrylate, and the like.

Specific examples of a bi-functional (meth)acrylate include: 1,6-hexane diol di(meth)acrylate, 1,10-decane diol di(meth)acrylate, neopentyl glycol di(meth)acrylate, 2,4-dimethyl-1,5-pentane diol di(meth)acrylate, butyl ethyl propane diol(meth)acrylate, ethoxylated cyclohexane methanol di(meth)acrylate, polyethylene glycol di(meth)acrylate, oligo-ethylene glycol di(meth)acrylate, ethylene glycol di(meth)acrylate, 2-ethyl-2-butyl-butane diol di(meth)acrylate, hydroxy pivalic acid neopentyl glycol di(meth)acrylate, EO-modified bisphenol A di(meth)acrylate, bisphenol F polyethoxy di(meth)acrylate, polypropylene glycol di(meth) acrylate, oligo-propylene glycol di(meth)acrylate, 1,4-butane diol di(meth)acrylate, 2-ethyl-2-butyl propane diol di(meth) acrylate, 1,9-nonane di(meth)acrylate, propoxylated ethoxylated bisphenol A di(meth)acrylate, tricyclodecane di(meth) acrylate, and the like.

Specific examples of a tri-functional (meth)acrylate include: trimethylol propane tri(meth)acrylate, trimethylol ethane tri(meth)acrylate, an alkylene oxide-modified tri (meth)acrylate of trimethylol propane, pentaerythritol tri (meth)acrylate, dipentaerythritol tri(meth)acrylate, trimethylol propane tri((meth)acryloyloxy propyl)ether, isocyanuric acid alkylene oxide-modified tri(meth)acrylate, propionic acid dipentaerythritol tri(meth)acrylate, tri((meth)acryloyloxy ethyl)isocyanurate, hydroxy pivalic aldehyde-modified dimethylol propane tri(meth)acrylate, sorbitol tri(meth)acrylate, propoxylated trimethylol propane tri(meth)acrylate, ethoxylated glycerin triacrylate, and the like.

Specific examples of a tetra-functional (meth)acrylate include: pentaerythritol tetra(meth)acrylate, sorbitol tetra (meth)acrylate, ditrimethylol propane tetra(meth)acrylate, propionic acid dipentaerythritol tetra(meth)acrylate, ethoxylated pentaerythritol tetra(meth)acrylate, and the like.

Specific examples of a penta-functional (meth)acrylate are: sorbitol penta(meth)acrylate or dipentaerythritol penta (meth)acrylate. Specific examples of a hexa-functional (meth)acrylate are: dipentaerythritol hexa(meth)acrylate, sorbitol hexa(meth)acrylate, an alkylene oxide-modified hexa(meth)acrylate of phosphazene, caprolactone-modified dipentaerythritol hexa(meth)acrylate, and the like.

Examples of a (meth)acrylamide usable in the present invention include: (meth)acrylamide, N-methyl(meth)acrylamide, N-ethyl(meth)acrylamide, N-propyl (meth)acrylamide, N-n-butyl(meth)acrylamide, N-t-butyl(meth)acrylamide, N-butoxy methyl (meth)acrylamide, N-isopropyl (meth)acrylamide, N-methylol (meth)acrylamide, N, N-dimethyl(meth)acrylamide, N,N-diethyl(meth)acrylamide, or (meth)acryloyl morphine.

Specific examples of aromatic vinyls usable in the present invention are: styrene, methyl styrene, dimethyl styrene, trimethyl styrene, ethyl styrene, isopropyl styrene, chloromethyl styrene, methoxy styrene, acetoxy styrene, chlorostyrene, dichlorostyrene, bromostyrene, methyl ester of vinyl benzoic acid, 3-methyl styrene, 4-methyl styrene, 3-ethyl styrene, 4-ethyl styrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethyl hexyl)styrene, 4-(2-ethyl hexyl)styrene, allyl styrene, isopropenyl styrene, butenyl styrene, octenyl styrene, 4-t-butoxycarbonyl styrene, 4-methoxystyrene, or 4-t-butoxystyrene.

Examples of radically polymerizable monomers usable in the present invention include: vinyl esters (vinyl acetate, vinyl propionate, vinyl versatate, or the like), allyl esters (allyl acetate, or the like), a halogen-containing monomer (vinylidene chloride, vinyl chloride, or the like), a vinyl ether (methyl vinyl ether, butyl vinyl ether, hexyl vinyl ether, methoxy vinyl ether, 2-ethyl hexyl vinyl ether, methoxyethyl vinyl ether, cyclohexyl vinyl ether, chloroethyl vinyl ether, or the like), a vinyl cyanide ((meth)acrylonitrile, or the like), or an olefin (ethylene, propylene, or the like).

Of these, from the viewpoint of curing speed, it is desirable to use a (meth)acrylate or a (meth)acrylamide as the radically polymerizable monomer in the present invention, and it is particularly desirable from the viewpoint of curing speed to use a tetra-functional (meth)acrylate or higher-functional (meth)acrylate. Moreover, from the viewpoint of the viscosity of the composition of the second liquid (ink), it is desirable to combine the use of a polyfunctional (meth)acrylate, with a monofunctional or bi-functional (meth)acrylate or (meth) acrylamide.

It is possible either to use one type of polymerizable material only, or to use two or more types of polymerizable material.

The content of the polymerizable material in the first liquid, or if necessary, in the second liquid, is desirably in the range of 50 wt % to 99.6 wt % with respect to the total solid content (weight) of the respective droplets, and more desirably, it is in the range of 70 wt % to 99.0 wt % and even more desirably, in the range of 80 wt % to 99.0 wt %, with respect to same.

Furthermore, desirably, the content of the polymerizable material in the droplets falls within the range of 20 wt % to 98 wt %, more desirably, the range of 40 wt % to 95 wt %, and especially desirably, the range of 50 wt % to 90 wt %, with respect to the total weight of the droplets.

Polymerization Initiator

The first liquid A and the second liquid B can be composed suitably by using at least one type of polymerization initiator, and desirably, a polymerization initiator is contained in the second liquid B at least. This polymerization initiator is a compound which generates initiators, such as radicals, upon application of activating light energy, heat energy, or both light and heat energy, thereby starting and promoting a polymerization or bridging reaction in the polymerizable compound described above, and hence curing same.

From the viewpoint of ensuring storage stability of the first liquid A and the second liquid B, it is desirable that this polymerization initiator should be contained separately from the polymerizable material, and in the present invention, a desirable mode is one in which the first liquid A contains the polymerizable compound described above, and the second liquid B, or another liquid, contains the polymerization initiator.

It is desirable to include a polymerization initiator which generates radical polymerization or cationic polymerization as the polymerization mode, and it is especially desirable to include a photo-polymerization initiator.

A polymerization initiator may be a compound which generates at least one of a radical, an acid and/or a base, by producing a chemical change due to the action of light or mutual interaction with the electronically excited state of a sensitizing dye. Of these, a photo-activated radical generating agent or a photo-activated acid generating agent is desirable, from the viewpoint of enabling polymerization to be started by means of the simple device of exposure to light.

As a photo-polymerization initiator, it is possible to use a material selected appropriately to have sensitivity with respect to the radiated activating light rays, for example, ultraviolet light having the wavelength of 400 nm to 200 nm, far ultraviolet light, g rays, h rays, i rays, KrF excimer laser light, ArF excimer laser light, an electron beam, X rays, a molecular beam, an ion beam, or the like.

Any photo-polymerization initiator that is commonly known by a person skilled in the art may be used, without any particular restrictions, and many specific examples of photo-polymerization initiators are described, for example, in: Bruce M. Monroe, et. al., Chemical Review, 93, 435 (1993); R. S. Davidson, Journal of Photochemistry and Biology A: Chemistry, 73.81 (1993); J. P. Faussier, "Photoinitiated Polymerization-Theory and Applications": Rapra Review, Vol. 9, Report, Rapra Technology (1998); and M. Tsunooka et al., Prog. Polym. Sci., 21.1 (1996). Furthermore, many chemically sensitized photoresists and compounds used in optical cationic polymerization are disclosed in "Organic Materials for Imaging," (edited by Japanese Research Association for Organic Electronics Materials, published by Bunshin (1993), pp. 187 to 192). Moreover, also known are a group of compounds which produce oxidative or reductive bond cleavage due to interaction with the electronically excited state of a sensitizing dye, such as those described, for example, in F. D. Saeva, Topics in Current Chemistry, 156, 59 (1990), G. G Maslak, Topics in Current Chemistry, 168, 1 (1993), H. B. Shuster, et al., JACS, 112, 6329 (1990), and I. D. F. Eaton, et al., JACS, 102, 3298 (1980).

Desirable examples of a photo-polymerization initiator are: (a) aromatic ketones; (b) aromatic onium salts; (c) organic peroxides; (d) hexaaryl diimidazole compounds; (e) ketoxime ester compounds; (f) borate compounds; (g) azinium compounds; (h) metallocene compounds; (i) activated ester compounds; (j) compounds having a carbon-halogen bond; and the like.

Desirable examples of the (a) aromatic ketones are, for example, compounds having a benzophenone skeleton or thioxanthone skeleton, such as those described in "Radiation Curing in Polymer Science and Technology," J. P. Fouassier and J. F. Rabek (1993), pp. 77 to 117. As more desirable examples of the (a) aromatic ketones, it is possible to cite: an α-thiobenzophenone compound as described in Japanese Patent Publication No. 47-6416; a benzoin ether compound as described in Japanese Patent Publication No. 47-3981; an α-substituted benzoin compound as described in Japanese Patent Publication No. 47-22326; a benzoin derivative as described in Japanese Patent Publication No. 47-23664; an aroyl phosphonic acid ester as described in Japanese Patent Application Publication No. 57-30704; a dialkoxy benzophenone as described in Japanese Patent Publication No. 60-26483; a benzoin ether as described in Japanese Patent Publication No. 60-26403 and Japanese Patent Application Publication No. 62-81345; an α-aminobenzophenone as described in Japanese Patent Publication No. 1-34242, U.S. Pat. No. 4,318,791, and European Patent No. 0284561 A1; a p-di(dimethyl aminobenzoyl)benzene as described in Japanese Patent Application Publication No. 2-211452; a thio-substituted aromatic ketone as described in Japanese Patent Application Publication No. 61-194062; an acyl phosphine sulfide as described in Japanese Patent Publication No. 2-9597; an acyl phosphine as described in Japanese Patent Publication No. 2-9596; a thioxanthone as described in Japanese Patent Application No. 63-61950; a cumarine as described in Japanese Patent Application No. 59-42864; and the like.

The (b) aromatic omium salts include aromatic omium salts of elements of groups V, VI and VII of the periodic table, and more specifically, N, P, As, Sb, Bi, O, S, Se, Te or I. For example, it is suitable to use: an iodonium salt as described in European Patent No. 104143, the specification of U.S. Pat. No. 4,837,124, Japanese Patent Application Publication No. 2-150848, and Japanese Patent Application Publication No. 2-96514; a sulfonium salt as described in the respective specifications of European Patent No. 370693, European Patent No. 233567, European Patent No. 297443, European Patent No. 297442, European Patent No. 279210, European Patent No. 422570, U.S. Pat. Nos. 3,902,144, 4,933,377, 4,760,013, 4,734,444 and 2,833,827; a diazonium salt (such as a benzene diazonium which may contain a substituted group); a resin of a diazonium salt (such as a formaldehyde resin of diazo diphenylamine); an N-alkoxy pyrridium salt (such as those described in the specification of U.S. Pat. No. 4,743,528, Japanese Patent Application Publication No. 63-138345, Japanese Patent Application Publication No. 63-142345, Japanese Patent Application Publication No. 63-142346 and Japanese Patent Publication No. 46-42363, and more specifically, 1-methoxy-4-phenyl pyrridium tetrafluoroborate, for instance); or a compound such as those described in Japanese Patent Publication No. 52-147277, Japanese Patent Publication No. 52-14278 and Japanese Patent Publication No. 52-14279. These salts may generate radicals or acids as the active species.

The (c) "organic peroxides" described above include almost all organic compounds having one or more oxygen-oxygen body in the molecule, but desirable examples of same are peroxide esters, such as: 3,3',4,4'-tetra-(t-butyl peroxycarbonyl)benzophenone, 3,3',4,4'-tetra-(t-amyl peroxycarbonyl)benzophenone, 3,3',4,4'-tetra-(t-hexyl peroxycarbonyl) benzophenone, 3,3',4,4'-tetra-(t-octyl peroxycarbonyl) benzophenone, 3,3',4,4'-tetra-(cumyl peroxycarbonyl) benzophenone, 3,3',4,4'-tetra-(p-iso-propyl cumyl peroxycarbonyl)benzophenone, di-t-butyl di-peroxy isophthalate, and the like.

As examples of the (d) hexaaryl diimidazoles mentioned above, it is possible to cite a lophine dimer as described in Japanese Patent Publication No. 45-37377 and Japanese Patent Publication No. 44-86516, such as: 2,2'-bis(o-chlorophenyl)-4,4',5,5'-tetraphenyl biimidazole; 2,2'-bis(o-bromophenyl)-4,4',5,5'-tetraphenyl biimidazole; 2,2'-bis(o,p-dichloro-phenyl)-4,4',5,5'-tetraphenyl biimidazole; 2,2'-bis (o-chlorophenyl)-4,4',5,5'-tetra-(m-methoxyphenyl) biimidazole; 2,2'-bis(o,o'-dichloro-phenyl)-4,4',5,5'-tetraphenyl biimidazole; 2,2'-bis(o-nitrophenyl)-4,4',5,5'-tetraphenyl biimidazole; 2,2'-bis(o-methyl-phenyl)-4,4',5,5'-tetraphenyl biimidazole; and 2,2'-bis(o-trifluoro-phenyl)-4,4',5,5'-tetraphenyl biimidazole, and the like.

As examples of the (e) ketoxium esters mentioned above, it is possible to cite, for example, 3-benzoyloxy-iminobutane-2-one, 3-acetoxy-iminobutane-2-one, 3-propionyloxy-iminobutane-2-one, 2-acetoxy-iminopentane-3-one, 2-acetoxy-imino-1-phenylpropane-1-one, 2-benzoyloxyimino-1-phenylpropane-1-one, 3-p-toluene sulfonyloxy iminobutane-2-one, and 2-ethoxycarbonyl oxyimino-1-phenylpropane-1-one, and the like.

Possible examples of the (f) borate compounds mentioned above are the compounds described in U.S. Pat. Nos. 3,567,453, 4,343,891, European Patent No. 109772 and European Patent No. 109773.

As examples of the (g) azinium compounds mentioned above, it is possible to cite a group of compounds having N—O bonds as described in Japanese Patent Application Publication No. 63-138345, Japanese Patent Application Publication No. 63-142345, Japanese Patent Application Publication No. 63-142346, Japanese Patent Application Publication No. 63-143537, and Japanese Patent Publication No. 46-42363.

As examples of the (h) metallocene compounds described above, it is possible to cite a titanocene compound as described in Japanese Patent Application Publication No. 59-152396, Japanese Patent Application Publication No. 61-151197, Japanese Patent Application Publication NQ. 63-41484, Japanese Patent Application Publication No. 2-249, or Japanese Patent Application Publication No. 2-4705, or an iron-arene complex as described in Japanese Patent Application Publication No. 1-304453 or Japanese Patent Application Publication No. 1-152109.

Specific examples of the aforementioned titanocene compound are:

di-cyclopentadienyl-Ti-di-chloride; di-cyclopentadienyl-Ti-bis-phenyl;

di-cyclopentadienyl-Ti-bis-2,3,4,5,6-pentafluorophen-1-yl; di-cyclopentadienyl-Ti-bis-2,3,5,6 tetrafluoro phen-1-yl; di-cyclopentadienyl-Ti-bis-2,4,6-trifluorophen-1-yl;

di-cyclopentadienyl-Ti-bis-2,6-di-fluorophen-1-yl;

di-cyclopentadienyl-Ti-bis-2,4-di-fluorophen-1-yl;

di-methyl-cyclopentadienyl-Ti-bis-2,3,4,5,6-pentafluorophen-1-yl;

di-methyl-cyclopentadienyl-Ti-bis-2,3,5,6-tetrafluorophen-1-yl;

di-methyl-cyclopentadienyl-Ti-bis-2,4-difluorophen-1-yl;

bis(cyclopentadienyl)-bis(2,6-difluoro-3-(pyr-1-yl)phenyl) titanium; bis(cyclopentadienyl)bis[2,6-difluoro-3-(methyl-sulfonamide)phenyl]titanium; and bis(cyclopentadienyl)bis[2,6-difluoro-3-(N-butyl biaroyl-amino)phenyl] titanium, and the like.

Examples of the (i) active ester compounds described above are: a nitrobenzyl ester compound as described in the specifications of European Patent No. 0290750, European Patent No. 046083, European Patent No. 156153, European Patent No. 271851 and European Patent No. 0388343, the specifications of U.S. Pat. Nos. 3,901,710 and 4,181,531, Japanese Patent Application Publication No. 60-198538, and Japanese Patent Application Publication No. 53-133022; an iminosulfonate compound as described in the specifications of European Patent No. 0199672, European Patent No. 84515, European Patent No. 199672, European Patent No. 044115, and European Patent No. 0101122, the specifications of U.S. Pat. Nos. 4,618,564, 4,371,605, and 4,431,774, Japanese Patent Application Publication No. 64-18143, Japanese Patent Application Publication No. 2-245756, and Japanese Patent Application Publication No. 4-365048; and a compound as described in Japanese Patent Publication No. 62-6223, Japanese Patent Publication No. 63-14340 and Japanese Patent Application Publication No. 59-174831.

Desirable examples of the (j) compounds containing an oxygen halogen bond mentioned above are, for instance: a compound as described by Wakabayashi, et al., in Bull. Chem. Soc. Japan, 42, 2924 (1969), a compound as described in the specification of GB Patent No. 1388492, a compound as described in Japanese Patent Application Publication No. 53-133428, a compound as described in the specification of German Patent No. 3337024, or the like. Furthermore, it is also possible to cite a compound described by F. C. Schaefer, et. al., in J. Org. Chem., 29, 1527 (1964), a compound described in Japanese Patent Application Publication No. 62-58241, a compound described in Japanese Patent Application Publication No. 5-281728, and the like. It is also possible to cite a compound described in German Patent No. 2641100, a compound described in German Patent No. 3333450, a group of compounds described in German Patent No. 3021590, or a group of compounds described in German Patent 3021599, or the like.

Desirable specific examples of the compounds expressed by (a) to (j) above include the following.

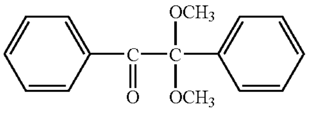

-continued
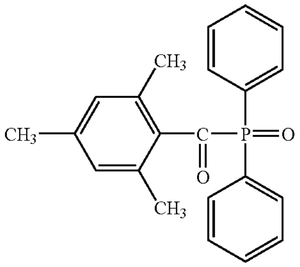
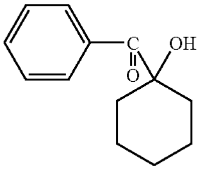
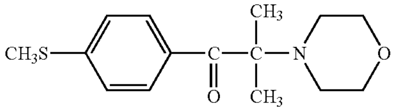
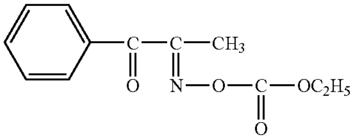
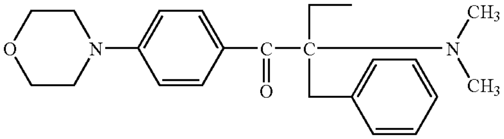
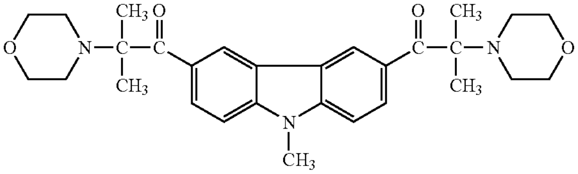
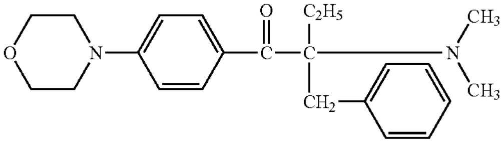
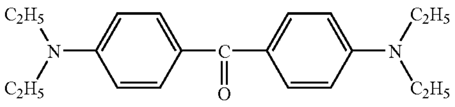
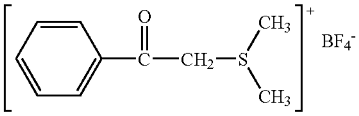
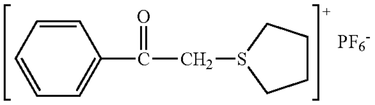
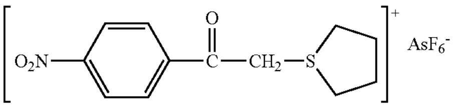
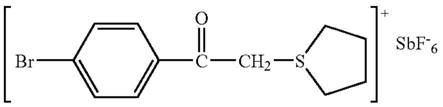
-continued
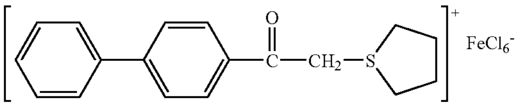
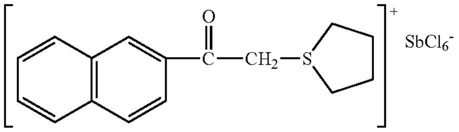
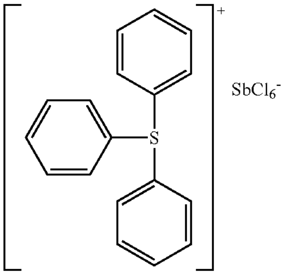
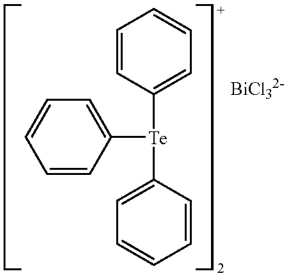
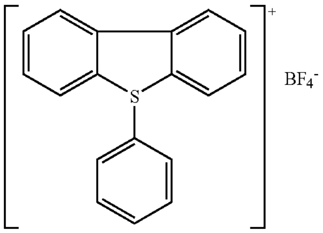
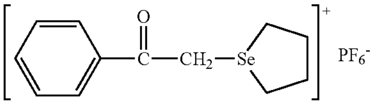
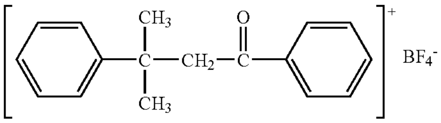
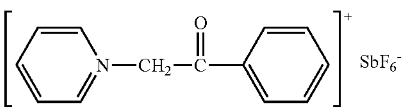
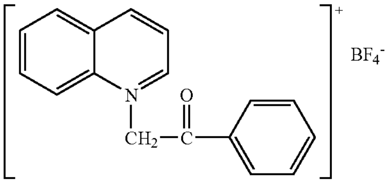

-continued
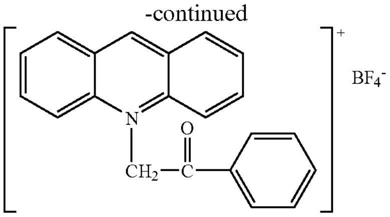
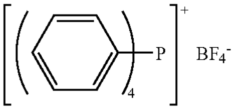
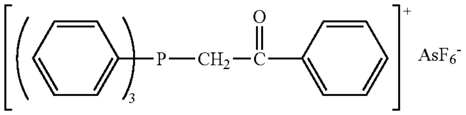
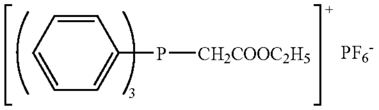
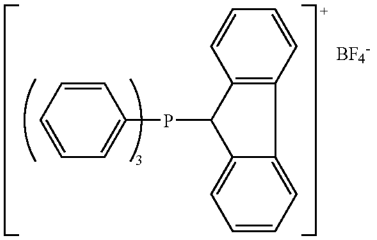
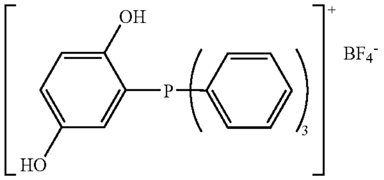
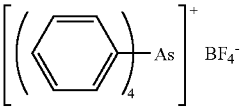
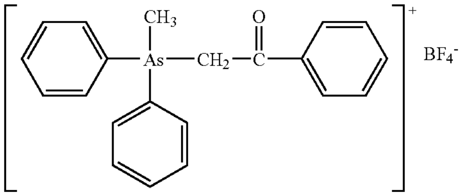
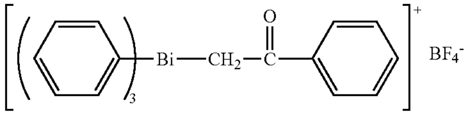
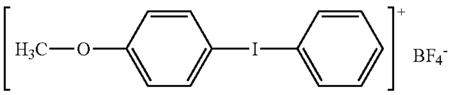
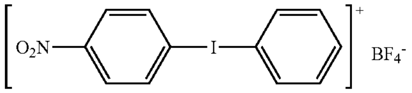
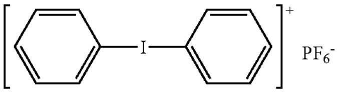
-continued
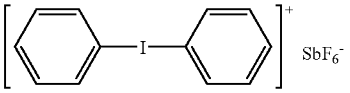
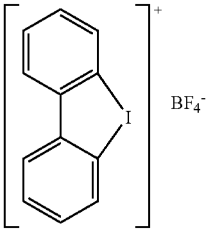
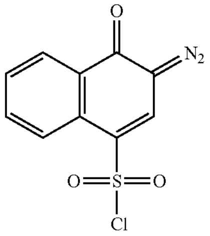
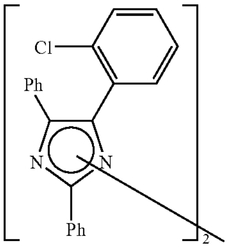
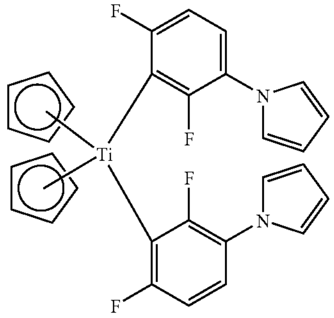
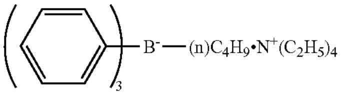
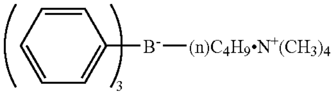
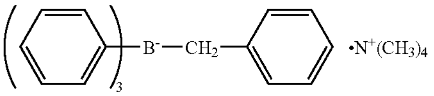
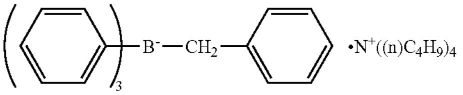
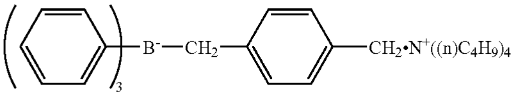
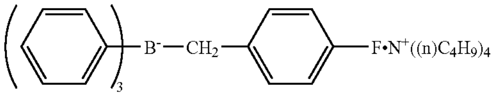
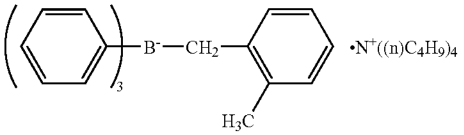

-continued

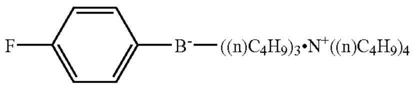

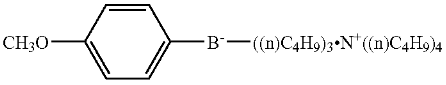

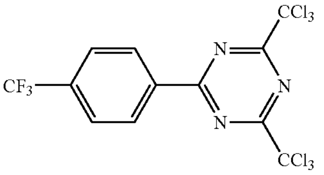

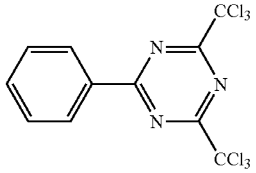

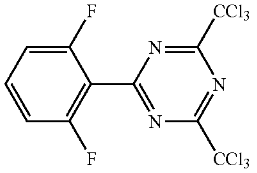

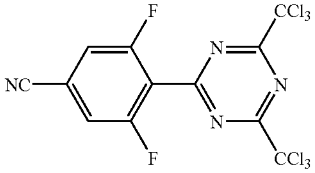

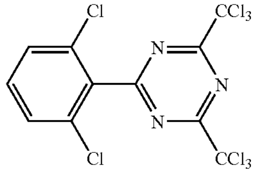

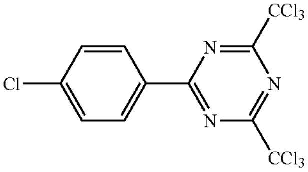

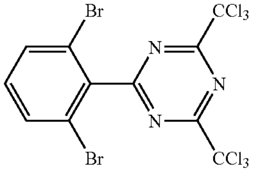

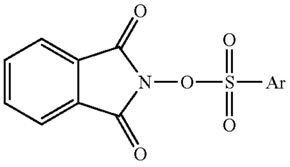

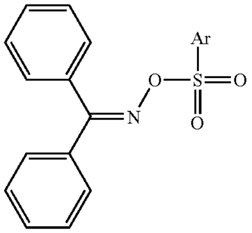

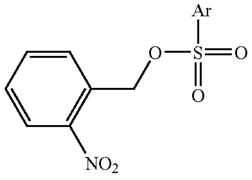

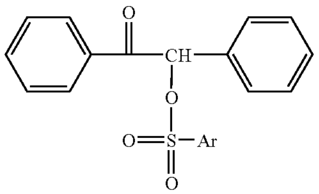

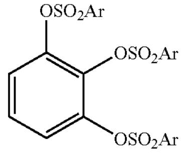

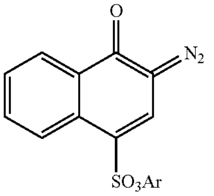

-continued

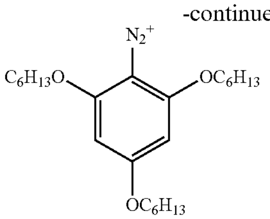

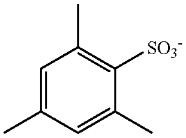

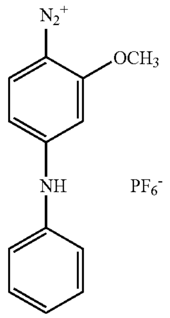

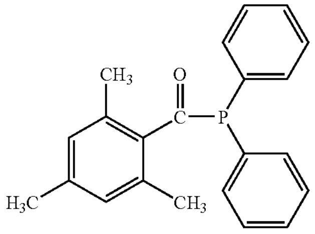

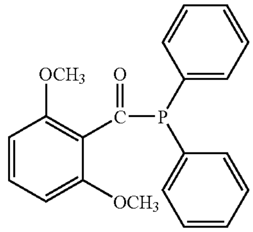

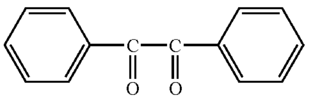

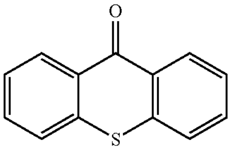

Desirably, the polymerization initiator has excellent sensitivity. Moreover, from the viewpoint of storage stability, it is not desirable to use a polymerization initiator which produces pyrolysis at a temperature of 80° C. or below, and therefore, preferably, a polymerization initiator which does not produce pyrolysis at temperatures up to 80° C. is chosen.

For the polymerization initiator, it is possible to use one type of initiator, or a combination of two or more types of initiator. Furthermore, provided that the beneficial effects of the present invention are not impaired, it is also possible to use a commonly known sensitizing agent, conjointly, with the object of improving sensitivity.

From the viewpoint of temporal stability, curability, and curing speed, the amount of polymerization initiator contained in the second liquid B is desirably, 0.5 wt % to 20 wt %, more desirably, 1 wt % to 15 wt %, and especially desirably, 3 wt % to 10 wt %, with respect to the polymerizable material applied per unit surface area when the maximum volumes of the first liquid A and the second liquid B required for image formation are applied in the form of droplets on the medium. If the content of polymerization initiator is too high, then precipitation or separation occurs over time, and the strength and wear resistance of the ink after curing are impaired.

The polymerization initiator may also be contained in the first liquid A as well as in the second liquid B, and in this case, it is possible to add polymerization initiator appropriately in such a manner that the amount of the polymerization initiator falls within a range which makes it possible to maintain a desired level of storage stability for the first liquid A.

Furthermore, the polymerization initiator may also be contained in the first liquid A without being contained in the second liquid B. In this case, the content of the polymerization initiator in the first liquid is desirably 0.5 wt % to 20 wt %, and more desirably, 1 wt % to 15 wt %, with respect to the polymerizable or bridgeable compound in the first liquid A.

Sensitizing Dye

In the present invention, a sensitizing dye may be added with the object of improving the sensitivity of the photopolymerization initiator. As a desirable example of a sensitizing dye, it is possible to cite a dye belonging to the following group of compounds, which has an absorption wavelength in the range of 350 nm to 450 nm.

Desirable examples of a sensitizing dye are: polynuclear aromatic compounds (such as pyrene, perylene and triphenylene); xanthenes (such as fluorescein, eosine, erythrosine, rhodamine B and rose bengale); cyanines (such as thia-carbo cyanine and oxa-carbo cyanine); merocyanines (such as merocyanine and carbo merocyanine); thiazines (such as thionine, methylene blue and toluidine blue); acridine dyes (such as acridine orange, chloroflavin and acriflavine); anthraquinones (such as anthraquinone); squaliums (such as squalium); and coumarins (such as 7-diethylamino-4-methyl coumarin).

More desirable examples of a sensitizing dye are the compounds represented by the following general formulas (IX) to (XIII) below.

(IX)

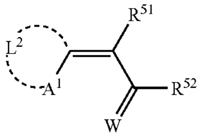

(X)

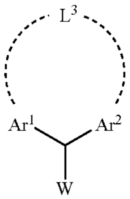

(XI)

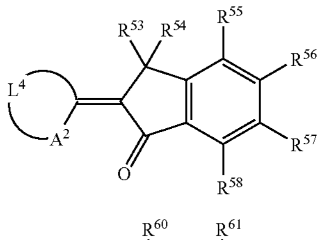

(XII)

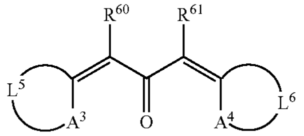

(XIII)

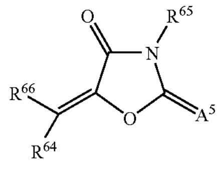

In Formula (IX), $A^1$ represents a sulfur atom or $NR^{50}$; $R^{50}$ represents an alkyl group or an aryl group; $L^2$ represents a non-metallic atomic group that forms a basic nucleus of the coloring material in conjunction with an adjacent $A^1$ and adjacent carbon atoms; $R^{51}$ and $R^{52}$ each represent a hydrogen atom or a monovalent non-metallic atomic group; and $R^{51}$ and $R^{52}$ may be linked to each other to form an acid nucleus of the coloring material. W represents an oxygen atom or a sulfur atom.

In Formula (X), $Ar^1$ and $Ar^2$ each represent an aryl group, and they are linked together by means of $L^3$. Here, $L^3$ represents —O— or —S—. Furthermore, W has the same meaning as that specified in general formula (IX).

In Formula (IX), $A^2$ represents a sulfur atom or $NR^{59}$, $L^4$ represents a non-metallic atomic group that forms a basic nucleus of the coloring material in conjunction with an adjacent $A^2$ and carbon atoms; $R^{53}$, $R^{54}$, $R^{55}$, $R^{56}$, $R^{57}$ and $R^{58}$ each represent a monovalent non-metallic atomic group; and $R^{59}$ represents an alkyl group or an aryl group.

In Formula (XII), $A^3$ and $A^4$ each represent —S— or —$NR^{62}$— or —$NR^{63}$—; $R^{62}$ and $R^{63}$ each represent a substituted or non-substituted alkyl group, and a substituted or non-substituted aryl group; $L^5$ and $L^6$ each represent a non-metallic atomic group that forms a basic nucleus of the coloring material in conjunction with the adjacent $A^3$ and $A^4$ and adjacent carbon atoms; and $R^{60}$ and $R^{61}$ each represent a hydrogen atom or a monovalent non-metallic atomic group, or they may be linked together in order to form an aliphatic or aromatic ring.

In Formula (XIII), $R^{66}$ represents an aromatic ring or a hetero ring which may have a substituted group, and $A^5$ represents an oxygen atom, a sulfur atom or —$NR^{67}$—. $R^{64}$, $R^{65}$ and $R^{67}$ each represent a hydrogen atom or a monovalent non-metallic atomic group; $R^{67}$ and $R^{64}$, and $R^{65}$ and $R^{67}$ may be linked with each together to form an aliphatic or aromatic ring.

Desirable specific examples of compounds represented by the general formulas (IX) to (XIII) below include the example compounds (A-1) to (A-20) listed below.

(A-1)

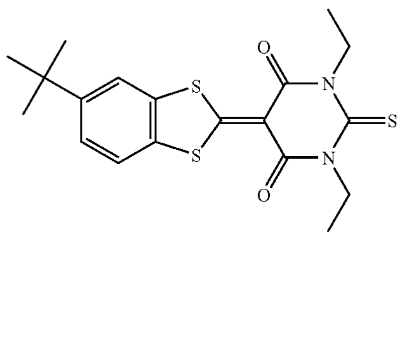

(A-2)

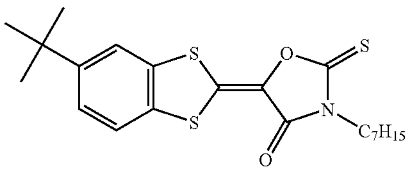

-continued
(A-3)
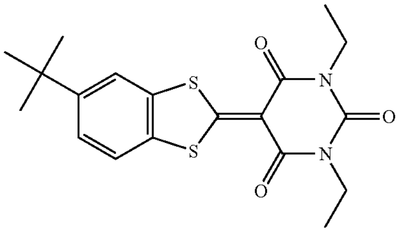
(A-4)
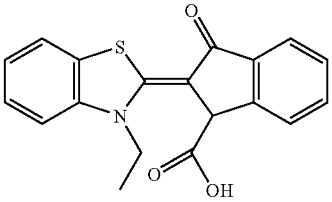
(A-5)
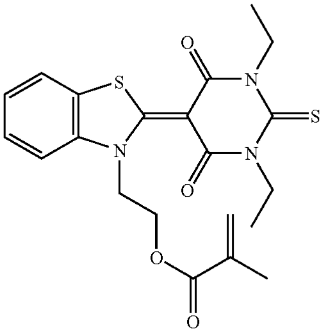
(A-6)
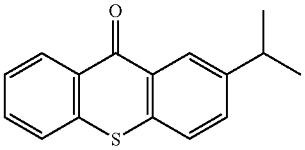
(A-7)
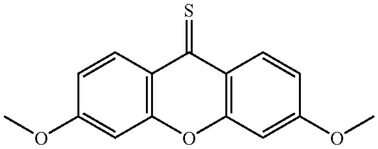
(A-8)
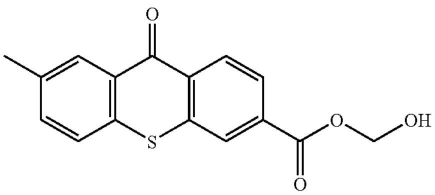
(A-9)
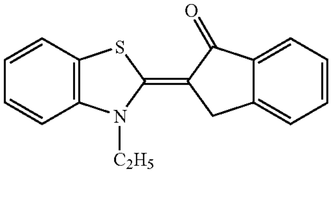
-continued
(A-10)
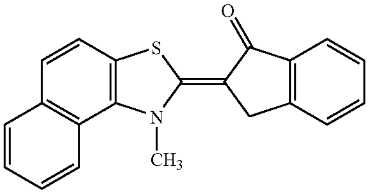
(A-11)
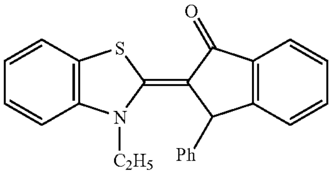
(A-12)
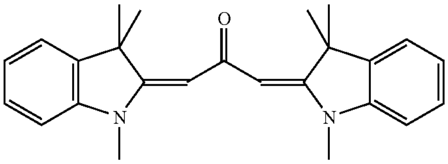
(A-13)
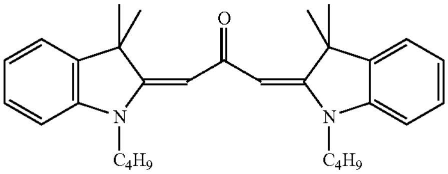
(A-14)
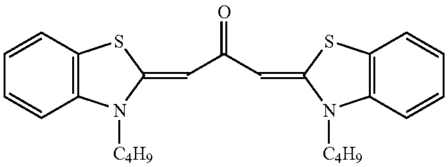
(A-15)
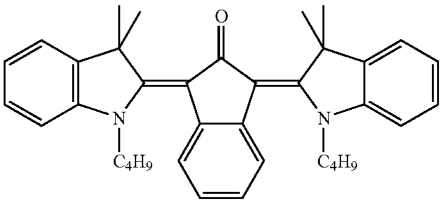
(A-16)
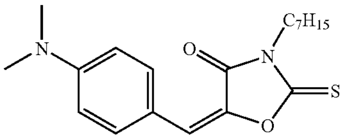
(A-17)
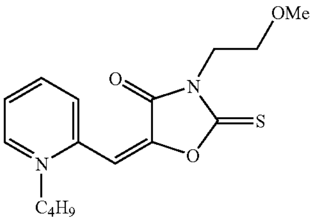

-continued (A-18)

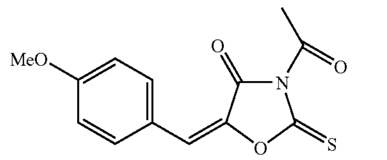

(A-19)

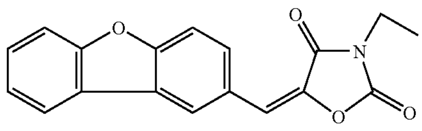

(A-20)

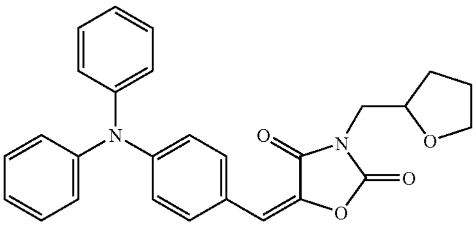

Co-Sensitizing Agent

Moreover, it is also possible to add a co-sensitizing agent, which is a commonly known compound having the action of further enhancing sensitivity or suppressing inhibition of the polymerization reaction by oxygen.

Examples of a co-sensitizing agent include amines, such as the compounds described, for example, in M. R. Sander et. al., "Journal of Polymer Society", Vol. 10, p. 3173 (1972), Japanese Patent Publication No. 44-20189, Japanese Patent Application Publication No. 51-82102, Japanese Patent Application Publication No. 52-134692, Japanese Patent Application Publication No. 59-138205, Japanese Patent Application Publication No. 60-84305, Japanese Patent Application Publication No. 62-18537, Japanese Patent Application Publication No. 64-33104, Research Disclosure No. 33825, and the like, and more specific examples of same are: triethanol amine, p-dimethyl amino benzoate ethyl ester, p-formyl dimethyl aniline, p-methylthio dimethyl aniline, and the like.

Other examples include thiols and sulfides, for example, a thiol compound as described in Japanese Patent Application Publication No. 53-702, Japanese Patent Publication No. 55-500806, or Japanese Patent Application Publication No. 5-142772, or a disulfide compound as described in Japanese Patent Application Publication No. 56-75643, and more specific examples are: 2-mercaptobenzothiazole, 2-meracpto-benzoxazole, 2-mercaptobenzoimidazole, 2-mercapto-4 (3H)-quinazoline, β-mercapto-naphthalene, and the like.

Other possible examples include amino acid compounds (for example, N-phenyl glycine), an organic metallic compound as described in Japanese Patent Publication No. 48-42965 (for example, tributyl tin acetate), a hydrogen donor as described in Japanese Patent Publication No. 55-34414, a sulfur compound as described in Japanese Patent Application Publication No. 6-308727 (for example, trithiane), a phosphorus compound as described in Japanese Patent Application Publication No. 6-250387 (diethyl phosphite, or the like), or an Si—H or Ge-H compound, or the like, as described in Japanese Patent Application Publication No. 8-65779.

Coloring Material

The coloring material may be a pigment or a dye, for example.

There are no particular restrictions on the coloring material used in the present invention, and provided that a color hue and color density that matches the object of use of the ink can be achieved, it is possible to select a coloring material appropriately from commonly known aqueous dyes, oil-based dyes and pigments. It is desirable that the liquid forming the inkjet recording ink is a non-aqueous liquid which does not contain an aqueous solvent, from the viewpoint of the stability of ink droplet ejection and rapid drying properties. Hence, it is desirable to use an oil-based dye or pigment which can readily be dispersed and dissolved uniformly in this non-aqueous liquid solution.

There are no particular restrictions on the oil-based dyes which are usable in the present invention, and any desired oil-based dye may be used. Desirably, in a case where an oil-based dye is used as the coloring material, the content ratio (converted to solid) of the dye falls within the range of 0.05 wt % to 20 wt %, more desirably, 0.1 wt % to 15 wt %, and even more desirably, 0.2 wt % to 6 wt %.

A mode which uses a pigment as the coloring material is desirable from the viewpoint of readily enabling the aggregation when mixing a plurality of types of liquids.

For the pigment used in the present invention, it is possible to use either an organic pigment or an inorganic pigment, and as regards a black pigment, a carbon black pigment, or the like, is desirable. Furthermore, in general, pigments of black, and three primary colors of cyan, magenta and yellow, are used, but depending on the required objective, it is also possible to use pigments having color hues, such as red, green, blue, brown, white, or the like, or a metallic lustrous pigment, such as gold or silver, or a colorless or weakly colored body pigment, or the like.

Moreover, for a pigment, it is also possible to use particles having a core material constituted by a particle of silica, alumina, or resin, with dye or pigment affixed to the surface thereof, or an insoluble lake compound of a dye, a colored emulsion, a colored latex, or the like.

Furthermore, it is also possible to use a pigment that has been coated with a resin. These are called micro-capsule pigments, and can be acquired as commercial products, from Dai-Nippon Ink Chemical Co., Ltd., Toyo Ink Co., Ltd., and the like.

From the viewpoint of achieving a balance between optical density and stability during storage, desirably, the volume-average particle size of the pigment particles contained in the liquid used for carrying out the present invention is in the range of 30 nm to 250 nm, and more desirably, 50 nm to 200 nm. Here, the volume-average particle size of the pigment particles can be measured by a measurement apparatus, such as an LB-500 (HORIBA, Ltd.).

From the viewpoint of optical density and ejection stability, the content ratio (converted to a solid) when using a pigment as a coloring material is desirably in the range of 0.1 wt % to 20 wt % in the liquid, and more desirably, in the range of 1 wt % to 10 wt %.

It is possible to use only one type of coloring material and it is also possible to combine two or more types of coloring material. Furthermore, it is possible to use different coloring materials or the same coloring material, for each liquid.

Diffusion Inhibitor

In the present specification, "diffusion inhibitor" indicates a substance which prevents diffusion or bleeding of the liquid containing coloring material after its deposition on the recording medium.

For the diffusion inhibitor, at least one agent including a polymer having an amino group, a polymer having an onium group, a polymer having a nitrogen-containing hetero ring, and a metal compound, is used.

It is possible to use only one type of polymer, and the like, or it is possible to combine a plurality of types of polymers. Here, the term "a plurality of types" includes, for example, a case of polymers which belong to the category of polymers having an amino group, but which have different structures, or a case of polymers belonging to different types, such as a polymer having an amino group and a polymer having an onium group. Furthermore, it is also possible to make an amino group, an onium group, a nitrogen-containing heterocycle, and a metal compound coexist within the same molecule.

High-Boiling-Point Organic Solvent (Oil)

In the present specification, a high-boiling-point organic solvent means an organic solvent having a viscosity at 25° C. of 100 mPa·s or below or a viscosity at 60° C. of 30 mPa·s or below, and a boiling point above 100° C.

Here, the "viscosity" in the present specification is the viscosity measured by using a RE80 type viscometer manufactured by Toki Sangyo Co., Ltd. The RE80 viscometer is based on the conical rotor/flat plate measurement system equivalent to the E type, and measurement is carried out using the Code No. 1 rotor, at a rotational speed of 10 rpm. In the case of material having a viscosity greater than 60 mpa·s, according to requirements, measurement is carried out by changing the rotational speed to 5 rpm, 2.5 rpm, 1 rpm, 0.5 rpm, and the like.

In the present specification, the "water solubility" is the saturation concentration of water in the high-boiling-point organic solvent at 25° C., and it indicates the mass (gram) of water that can be dissolved per 100 g of the high-boiling-point organic solvent at 25° C.

Desirably, the amount of the high-boiling-point organic solvent used is 5 wt % to 2000 wt % with respect to an applied amount and more desirably, 10 wt % to 1000 wt % with respect to an applied amount.

Storage Stabilizer

In the present specification, it is possible to add a storage stabilizer, with the aim of suppressing unwanted polymerization during storage of the plurality of types of liquids. Desirably, a storage stabilizer is contained in the liquid containing the polymerizable compound, and furthermore, it is desirable to use a storage stabilizer that is soluble in the liquid or other components in which it is contained.

For the storage stabilizer, it is possible to use a class quaternary ammonium salt, a hydroxylamine, an annular amide, a nitrile, a substituted urea derivative, a complex ring compound, an organic acid, hydroquinone, a hydroquinone monoether, an organic phosphine, a copper compound, or the like.

Desirably, the added amount of the storage stabilizer is adjusted suitably on the basis of the activity of the polymerization initiator used, the polymerization characteristics of the polymerizable compound, and the type of storage stabilizer, but from the viewpoint of achieving a balance between storage stability and curability of the ink when the liquids are mixed, desirably, the amount (in solid conversion) in the liquid is 0.005 wt % to 1 wt %, and more desirably, 0.01 wt % to 0.5 wt %, and even more desirably, 0.01 wt % to 0.2 wt %.

Radiation

For the radiation used in the present invention to promote the polymerization of the polymerizable compound, it is possible to use ultraviolet light, visible light, or the like. Moreover, it is also possible to apply energy by means of radiation other than light, such as α rays, γ rays, X rays, an electron beam, or the like, but of these various options, the use of ultraviolet light or visible light is more desirable from the viewpoints of cost and safety, and the use of ultraviolet light is even more desirable. If curing is performed by means of an electron beam, then the polymerization initiator is not required. The amount of energy required for the polymerization reaction varies depending on the type and the amount of the polymerization initiator, but in general, it is about 1 $mJ/cm^2$ to 500 $mJ/cm^2$.

EXAMPLES

There follows a detailed description of practical examples 1 to 4.

Practical Example 1

First liquid

In Practical example 1, the following thirteen types of liquid (i.e., liquids 101 to 113) were prepared as the first liquid. Each of the liquids 101 to 113 was obtained by mixing together the compounds described below and agitating at normal temperature, and then passing through a 5 μm membrane filter.

<Liquid 101>
diethyl phthalate: 100 wt %
<Liquid 102>
diethyl phthalate: 99.95 wt %
sodium di-2 ethyl hexyl sulfosuccinate: 0.05 wt %
<Liquid 103>
diethyl phthalate: 99.9 wt %
sodium di-2 ethyl hexyl sulfosuccinate: 0.1 wt %
<Liquid 104>
diethyl phthalate: 99.5 wt %
sodium di-2 ethyl hexyl sulfosuccinate: 0.5 wt %
<Liquid 105>
diethyl phthalate: 99.0 wt %
sodium di-2 ethyl hexyl sulfosuccinate: 1.0 wt %
<Liquid 106>
diethyl phthalate: 99.99 wt %
Megafac F475 (manufactured by Dai-Nippon Ink & Chemicals, Inc.): 0.01 wt %
<Liquid 107>
diethyl phthalate: 99.95 wt %
Megafac F475 (manufactured by Dai-Nippon Ink & Chemicals, Inc.): 0.05 wt %
<Liquid 108>
diethyl phthalate: 99.93 wt %
Megafac F475 (manufactured by Dai-Nippon Ink & Chemicals, Inc.): 0.07 wt %
<Liquid 109>
diethyl phthalate: 99.9 wt %
Megafac F475 (manufactured by Dai-Nippon Ink & Chemicals, Inc.): 0.1 wt %
<Liquid 110>
diethyl phthalate: 99.66 wt %
Megafac F475 (manufactured by Dai-Nippon Ink & Chemicals, Inc.): 0.34 wt %

<Liquid 111> diethyl phthalate: 98.3 wt %

Megafac F475 (manufactured by Dai-Nippon Ink & Chemicals, Inc.): 1.7 wt %

<Liquid 112> diethyl phthalate: 98.3 wt % zinc 2-ethyl hexanoate: 1.7 wt %

<Liquid 113> diethyl phthalate: 97.3 wt % zinc 2-ethyl hexanoate: 1.7 wt % sodium di-2 ethyl hexyl sulfosuccinate: 1.0 wt %

For each of the liquids 101 to 113 forming the first liquid, the dynamic surface tension (which is denoted with "$\gamma_1$ (0.1 s)") at a surface age of 0.1 seconds at a measurement temperature of 25° C. was measured by using the Bubble Pressure Tensiometer BP2 manufactured by Krüss GmbH. The theory of the bubble pressure method can be found, for example, on the Internet (URL: http://www.kruss.info/techniques/bubble_ pressure_e.html). The static surface tension (which is denoted with "$\gamma_1$(static)") was measured by using the surface tensiometer CBVP-Z manufactured by Kyowa Interface Science Co., Ltd. at a measurement temperature of 25° C. The results of the measurement are shown in FIG. 7. In the following description of the present specification, the dynamic surface tension and static surface tension measurements were also carried out at a measurement temperature of 25° C.

Second Liquid (Ink)

In the practical example 1, the following four types of ink (i.e., liquids 201 to 204), each including cyan pigment, polymerizable compound and polymerization initiator, were prepared as a second liquid. Each type of ink was obtained by mixing and dissolving the compounds described below, and agitating at normal temperature.

<Liquid 201>

Polymerizable compound: DPCA60 (manufactured by Nippon Kayaku Co. Ltd.): 2.6 wt %

Coloring material: phthalocyanine: 5.0 wt %

Dispersant: Solsperse 28000 (manufactured by Avecia Ltd.): 0.7 wt %

Polymerization initiator: Irg1870 (manufactured by Ciba Specialty Chemicals Ltd.): 6.0 wt %

Polymerizable compound: 1,6-hexane diol diacrylate (HDDA made by Daicel UPC):

remainder

<Liquid 202>

Polymerizable compound: DPCA60 (manufactured by Nippon Kayaku Co. Ltd.): 2.6 wt %

Coloring material: phthalocyanine: 5.0 wt %

Dispersant: Solsperse 28000 (manufactured by Avecia Ltd.): 0.7 wt %

Polymerization initiator: Irg1870 (manufactured by Ciba Specialty Chemicals Ltd.): 6.0 wt % sodium di-2 ethyl hexyl sulfosuccinate: 5.0 wt %

Polymerizable compound: 1,6-hexane diol diacrylate (HDDA made by Daicel UPC):

remainder

<Liquid 203>

Polymerizable compound: DPCA60 (manufactured by Nippon Kayaku Co. Ltd.): 2.6 wt %

Coloring material: phthalocyanine: 5.0 wt %

Dispersant: Solsperse 28000 (manufactured by Avecia Ltd.): 0.7 wt %

Polymerization initiator: Irg1870 (manufactured by Ciba Specialty Chemicals Ltd.): 6.0 wt % poly(2-ethyl hexyl acrylate): 10.0 wt %

Polymerizable compound: 1,6-hexane diol diacrylate (HDDA made by Daicel UPC):

remainder

<Liquid 204>

Polymerizable compound: DPCA60 (manufactured by Nippon Kayaku Co. Ltd.): 2.6 wt %

Coloring material: phthalocyanine: 5.0 wt %

Dispersant: Solsperse 28000 (manufactured by Avecia Ltd.): 0.7 wt %

Polymerization initiator: Irg1870 (manufactured by Ciba Specialty Chemicals Ltd.): 6.0 wt %

Megafac F475 (manufactured by Dai-Nippon Ink & Chemicals, Inc.): 1.0 wt %

Polymerizable compound: 1,6-hexane diol diacrylate (HDDA): remainder

For each of the liquids (inks) 201 to 204, in a similar fashion to the first liquid described above, the dynamic surface tension (which is denoted with "$\gamma_2$(0.1 s)") at a surface age of 0.1 seconds at a measurement temperature of 25° C. was measured by using the Bubble Pressure Tensiometer BP2 manufactured by Krüss GmbH, and the static surface tension (notation: "$\gamma_2$(static)") was measured by using the surface tensiometer CBVP-Z manufactured by Kyowa Interface Science Co., Ltd. FIG. 8 shows the results of the measurement.

The following experiment was carried out by using the first liquids 101 to 113, and the second liquids or inks 201 to 204.

Firstly, the first liquid was applied by a bar coater on a transparent polyethylene terephthalate sheet (thickness: 60 μm). Here, the liquid films of the first liquid were thus formed, and the liquid films have thicknesses of 1.4 μm, 1.5 μm, 1.6 μm, 2.0 μm, 5 μm, and 10 μm, respectively. Next, straight lines were printed by ejecting ink droplets by single pass ejection on the region where the liquid film of the first liquid was present, by using an inkjet droplet ejection test device (piezoelectric system, dot density: 300 dpi, ejection frequency: 2 kHz, droplet size: 10 pl), and the ink was then cured by immediately radiating ultraviolet light from a metal halide lamp (having an irradiation intensity of approximately 500 mJ/cm at a wavelength of 365 nm).

The shape of the line figures printed in this way was evaluated by observation using an optical microscope, and the results shown in FIG. 9 were obtained.

In FIG. 9, "A" indicates that there is no depositing interference, the dots are completely independent, and the dot size is small and satisfactory; "B" indicates that there is no depositing interference and the dots are completely independent; "C" indicates that partial depositing interference has occurred and there is some width variation or distortion of the line as a result of coalescence of the dots; "D" indicates that depositing interference has occurred and there is marked width variation (and more specifically, broadening) or distortion of the line as a result of coalescence of the dots; and "E" indicates that depositing interference has occurred over the whole surface and there is marked width variation and distortion of the line as a result of coalescence of the dots.

If the thickness of the liquid film of the first liquid applied on the recording medium is 1.6 μm or above and if $\gamma_1$ (0.1 s)<$\gamma_2$(0.1 s), then the depositing interference could be avoided.

The foregoing description relates to an example of experimental evaluation in a case where the ink forming the second liquid is ejected at a droplet size of 10 pl. When an experiment was carried out by changing the droplet size to 5 μl, it was confirmed that even if the liquid film thickness of the first liquid is 1.0 μm, provided that conditions of $\gamma_1$(0.1 s)<$\gamma_2$ (0.1 s) are satisfied, then the "A" or "B" evaluation could be obtained. In this case, variation in the extent of the spreading of the dots was observed, depending on the printing position. This is because the thickness of the liquid film of the first liquid differs according to the position.

Furthermore, the aggregating properties were also evaluated by experimentation as described below.

The ink (selected from the liquids 201 to 204) having a volume of 1.0 ml was mixed with 100 ml of the first liquid (selected from the liquids 101 to 113). The pigment particle size distribution in this mixture was then measured using a laser type granularity distribution measurement apparatus (a UPA-EX150 manufactured by Nikkiso Co. Ltd.), immediately after the mixing. It was judged that there was aggregation if the mean diameter became 2.0 or more times larger than the mean diameter of the original phthalocyanine pigment.

The results of this evaluation are shown in FIG. 10. As shown in FIG. 10, it was judged that there was aggregation when the liquid 112 or liquid 113 which contains polyvalent metallic salt additive was combined with the ink.

Furthermore, the change in color hue as a result of aggregation was also evaluated by experimentation as described below.

Solid image patches were printed using the inkjet droplet ejection test device described above, and the color hues of the solid patches were compared visually between cases where the first liquid was applied and cases where the first liquid was not applied. It could be judged that there was a variation in color hue that caused the cyan color to have a red shade, as well as a clear decline in color saturation, only in the cases of the liquids 112 and 113, which have a multivalent metallic salt additive.

Practical Example 2

In Practical example 2, the following four types of liquid (i.e., liquids 121 to 124) were prepared as the first liquid. The liquids 121 to 124 include a polymerizable compound and a polymerization initiator, in order to perform a polymerization reaction when irradiated with ultraviolet light.

<Liquid 121>
Polymerizable compound: HDDA: 95.0 wt %
Polymerization initiator: Irg1870: 5.0 wt %

<Liquid 122>
Polymerizable compound: HDDA: 96.0 wt %
Polymerization initiator: Irg1870: 5.0 wt %
sodium di-2 ethyl hexyl sulfosuccinate: 1.0 wt %

<Liquid 123>
Polymerizable compound: HDDA: 96.0 wt %
Polymerization initiator: Irg1870: 5.0 wt %
Megafac F475: 1.0 wt %

<Liquid 124>
Polymerizable compound: HDDA: 94.3 wt %
Polymerization initiator: Irg1870: 5.0 wt %
Megafac F475: 1.7 wt %

For each of the first liquids 121 to 124, the dynamic surface tension at a surface age of 0.1 seconds ($\gamma_1$(0.1 s)) was measured by using the Bubble Pressure Tensiometer BP2 manufactured by Krüss GmbH, and the static surface tension ($\gamma_1$ (static)) was measured by using the surface tensiometer CBVP-Z manufactured by Kyowa Interface Science Co., Ltd. In this case, the values shown in FIG. 11 were obtained.

Experiments were carried out using the same experimental method as in Practical example 1, using the liquids 121 to 124 as the first liquid, and using the liquids 201 to 204 described in the practical example 1 as the ink. In other words, the first liquid was applied by a bar coater, straight lines were printed by ejecting droplets of ink using an inkjet printer, on the region where the liquid film composed of the first liquid was present, and the ink was cured by immediately radiating ultraviolet light. The shape of the line figures printed in this way was evaluated by observation using an optical microscope, and the results shown in FIG. 12 were obtained. In FIG. 12, "A", "B" and "D" have the same meanings as in FIG. 9, and since they have been described above, no further explanation is given here.

Next, a case where the first liquid is applied in the form of droplets as well as ink is described.

Various text characters were printed in a single pass on a sheet of PET (polyethylene terephthalate), using a test device fitted with a CA-3 inkjet head manufactured by Toshiba Tec Corp. (two heads per color; dot density: 300 dpi; droplet ejection frequency: 4.8 kHz; media conveyance speed: 400 mm/sec; droplet size: variable in 7 steps between 6 pl and 42 pl).

Firstly, droplets of each of the first liquids 121 to 124 were ejected. The droplet ejection region of the first liquid was broader than the droplet ejection region of the ink by 3 dots. The size of the droplets of the first liquid was set to 6 pl, 12 pl, or 42 pl, and the droplets were ejected from the liquid ejection head for ejecting the first liquids. Thereupon, droplets of each of the inks 201 to 204 were ejected at a droplet volume of 12 pl, from the adjacent ink ejection head for ejecting the inks. Thereupon, the liquids were cured by radiating ultraviolet light.

The relationship between the size of the droplets of the first liquid and the thickness (film thickness) of the liquid film composed of the first liquid applied on the recording medium is as follows: a droplet volume of 6 pl corresponds to a film thickness of 0.8 μm, a droplet volume of 12 pl corresponds to a film thickness of 1.7 μm, and a droplet volume of 42 pl corresponds to a film thickness of 5.6 μm.

The image quality was evaluated by observing the image thus obtained by means of an optical microscope. The results of this are shown in FIG. 13. In FIG. 13, "A", "B" and "D" have the same meanings as in FIG. 9, and since they have been described above, no further explanation is given here.

When the size of the droplets of the first liquid applied on the recording medium was 12 pl or above, and if the following relationship was satisfied: $\gamma_1$(0.1 s)<$\gamma_2$(0.1 s), then the depositing interference could be obtained, similarly to cases where the first liquid was applied by a coater.

As shown in FIG. 13, in Practical example 2, it is particularly desirable that the static surface tension $\gamma_1$(static) of the first liquid is less than 25 mN/m. The reason of this is thought to be as follows: since the first liquid is deposited by droplet ejection, then the first liquid needs to spread quickly and uniformly on the recording medium, and therefore, it is desirable that the static surface tension is low, while the static surface tension of the first liquid falls within a range that does not degrade the ink-repelling properties on the nozzle surface.

Practical Example 3

First Liquid

In Practical example 3, the following liquids 131 to 133 were prepared as the first liquid.

<Liquid 131> (First Liquid Containing Oxirane Compound and Oxetane Compound)

The liquid 131 which contains an oxirane compound and an oxetane compound was prepared by mixing, dissolving and agitating the following constituent components. The static surface tension $\gamma_1$(static) of the liquid 131 was 23 mN/m, and the dynamic surface tension $\gamma_1$(0.1 s) was 28 mN/m.

Bis{[1-ethyl(3-oxetanil)]methyl}ether (OXT-221: manufactured by To a Gosei Co. Ltd.): 4.18 g 1-methyl-4-(2-methyl oxyranil)-7-oxabiciclo[4.1.0]heptane (cel3000: manufactured by Daicel Saitech Co. Ltd.): 9.77 g 9,10-dibutoxy anthracene: 0.75 g Megafac F475: 0.3 g <Liquid 132> (First Liquid Containing Only Oxirane Compound as Polymerizable Compound)

The liquid 132 which contains an oxirane compound was prepared by mixing, dissolving and agitating the following constituent components. The static surface tension $\gamma_1$(static) of the liquid 132 was 23 mN/m, and the dynamic surface tension $\gamma_1$(0.1 s) was 28.5 mN/m.

1-methyl-4-(2-methyl oxyranil)-7-oxabiciclo[4.1.0]heptane (Cel3000: manufactured by Daicel Saitech Co. Ltd.): 13.95 g 9,10-dibutoxy anthracene: 0.75 g Megafac F475: 0.3 g <Liquid 133> (First Liquid Containing Only Oxetane Compound as Polymerizable Compound)

The liquid 133 which is a first liquid containing an oxetane compound was prepared by mixing, dissolving and agitating the following constituent components. The static surface tension $\gamma_1$(static) of the liquid 133 was 23 mN/m, and the dynamic surface tension $\gamma_1$(0.1 s) was 28.2 mN/m.

Bis{[1-ethyl (3-oxetanil)]methyl}ether (OXT-221): 13.95 g 9,10-dibutoxy anthracene: 0.75 g Megafac F475: 0.3 g Second Liquid (Ink)

In the practical example 3, the following liquids 231 to 233 were prepared as the second liquid.

<Liquid 231> (Ink Containing Polymerization Initiator, and Oxirane Compound and Oxetane Compound as Polymerizable Compounds)

16 g of PB 15:3 (Irgalite Blue Glo, manufactured by Ciba Specialty Chemicals Ltd.), 48 g of bis{[1-ethyl (3-oxetanil)] methyl}ether (OXT-221, manufactured by To a Gosei Co. Ltd.) and 16 g of BYK-168 (manufactured by BYK-Chemie) were mixed together and agitated for one hour by a stirrer. After agitation, the mixture was dispersed in an Eiger mill, to yield a pigment dispersion (hereinafter referred to as "P-1").

Here, the dispersion conditions of the Eiger mill were a dispersion time of 1 hour at a circumferential speed of 9 m/s with a filling of zirconia beads having 0.65 mm diameter at a filling rate of 70%.

The liquid 231 was prepared by mixing, dissolving and agitating the following constituent components. The dynamic surface tension $\gamma_2$(0.1 s) of the liquid 231 was 32 mN/m.

The aforementioned pigment dispersion "P-1": 3.75 g bis{[1-ethyl(3-oxetanil)]methyl}ether: 0.825 g 1-methyl-4-(2-methyl oxyranil)-7-oxabiciclo[4.1.0]heptane (cel3000: manufactured by Daicel Saitech Co. Ltd.): 8.925 g The polymerization initiator shown in the following formula (Irg250: manufactured by Ciba Specialty Chemicals Ltd.): 1.5 g

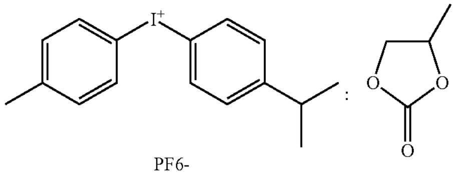

= 3:1

<Liquid 232> (Ink Containing Polymerization Initiator and Only Oxirane Compound as Polymerizable Compound)

16 g of PB 15:3 (Irgalite Blue Glo), 48 g of 1-methyl-4-(2-methyl oxyranil)-7-oxabiciclo[4.1.0]heptane (Cel3000) and 16 g of BYK-168 (manufactured by BYK-Chemie) were mixed together and agitated for one hour by a stirrer. After agitation, the mixture was dispersed in an Eiger mill, to yield a pigment dispersion (hereinafter referred to as "P-2").

Here, the dispersion conditions of the Eiger mill were a dispersion time of 1 hour at a circumferential speed of 9 ml/s with a filling of zirconia beads having 0.65 mm diameter at a filling rate of 70%.

The liquid was prepared by mixing, dissolving and agitating the following constituent components. The dynamic surface tension $\gamma_2$(0.1 s) of the liquid 232 was 32 mN/m.

The aforementioned pigment dispersion "P-2": 3.75 g 1-methyl-4-(2-methyl oxyranil)-7-oxabiciclo[4.1.0]heptane (Cel3000: manufactured by Daicel Saitech Co. Ltd.): 9.75 g The aforementioned polymerization initiator Irg250:1.5 g <Liquid 233> (Ink Containing Polymerization Initiator and Only Oxetane Compound as Polymerizable Compound)

The liquid 233 which contains an oxetane compound and a pigment dispersion was prepared by mixing, dissolving and agitating the following constituent components. The dynamic surface tension $\gamma_2$(0.1 s) of the liquid 233 was 32 mN/m.

The aforementioned pigment dispersion "P-2": 3.75 g bis{[1-ethyl (3-oxetanil)]methyl}ether (OXT-221): 9.75 g The aforementioned polymerization initiator Irg250: 1.5 g The first liquid and the second liquid were both ejected at an ejection volume of 21 pl, for respective combinations of the first liquids (the liquids 131 to 133) and the second liquids (the liquids 231 to 233) described above, and the same evaluation as in the aforementioned practical examples was carried out.

The width of the line figures (line width) formed on the recording medium was satisfactory in the case of all of the combinations.

Furthermore, in order to evaluate the curing sensitivity, the radiation intensity of the UV light source was reduced to 300 mJ/cm$^2$ at 365 nm, ultraviolet light was radiated, and the image surface (recording surface) was then rubbed with a finger to perceive stickiness, the results being evaluated on the basis of the following assessment criteria: "A" indicating that no stickiness was perceived, "B" indicating that slight stickiness was perceived; and "C" indicating that marked stickiness was perceived.

Moreover, in order to evaluate solidification on the head surface which is caused by ultraviolet light leaking on the head surface and which leads to ejection defects, the ultraviolet light source was switched on with the shutter open, and in this state, ejection was carried out continuously for 24 hours. The rate of change of the total number of nozzles which normally eject the first liquid or the ink (namely, the number of nozzles ejecting normally after ejection for 24 hours/the number of nozzles ejecting normally at the start of the experiment) was duly evaluated.

The results of these evaluations are shown in FIG. 14.

As shown in FIG. 14, from the viewpoint of curing sensitivity and solidification on the head surface, the most preferable case was the one where the liquid 132, which contains an oxirane compound only as a polymerizable compound, was used as the first liquid, which is applied firstly on the recording medium, and the liquid 233, which contains a polymerization initiator and also contains only an oxetane compound as the polymerizable compound, was used as the second liquid (ink), which is applied subsequently on the recording medium. In summary, it was seen that, by applying the polymerization initiator and the polymerizable compound which starts reaction quickly, on the recording medium in a separate fashion, it is possible to avoid the problem of curing on the head surface caused by the leaking of ultraviolet light onto the head surface.

Practical Example 4

In Practical example 4, four inks (the liquid 232 described above, and liquids 241, 251 and 261 described below) of the colors C (cyan), M (magenta), Y (yellow), and K (black) were prepared.

<Liquid 241> (ink containing magenta pigment)

The liquid 241 containing a magenta pigment was prepared by the same preparation method as in the liquid 232, with the exception that in preparing the pigment dispersion, the PB 15:3 (Irgalite Blue Glo, manufactured by Ciba Specialty Chemicals Ltd.) was replaced with an equivalent amount of PV19 (Hostaparm RED E5B02: manufactured by Clariant Corp.), as the pigment. The dynamic surface tension $\gamma_2$(0.1 s) of the liquid 241 was 32 mN/m.

<Liquid 251> (ink containing yellow pigment)

The liquid 251 containing a yellow pigment was prepared by the same preparation method as the liquid 232, with the exception that in preparing the pigment dispersion, the PB 15:3 (Irgalite Blue Glo, manufactured by Ciba Specialty Chemicals Ltd.) was replaced with an equivalent amount of PY74(Irgalite Yellow GO: manufactured by Ciba Specialty Chemicals Ltd.), as the pigment. The dynamic surface tension $\gamma_2$(0.1 s) of the liquid 251 was 33 mN/m.

<Liquid 261> (ink containing carbon black pigment)

The liquid 261 containing a carbon black pigment was prepared by the same preparation method as the liquid 232, with the exception that in dispersing the pigment, the PB 15:3 (Irgalite Blue Glo, manufactured by Ciba Specialty Chemicals Ltd.) was replaced with an equivalent amount of carbon black MA7 (manufactured by Mitsubishi Chemical Corp.), as the pigment. The dynamic surface tension $\gamma_2$(0.1 s) of the liquid 261 was 34 mN/m.

The same beneficial results described above were obtained when the aforementioned inks (the liquids 232, 241, 251 and 261) were printed by means of a printer having a line head.

In other words, it is possible to avoid the problem of curing on the head surface due to the leaking of ultraviolet light onto the head surface, by separating the polymerization initiator from the monomer that immediately reacts.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming method for forming a desired image on a recording medium, the method comprising the steps of:

applying a first liquid on the recording medium, the first liquid containing no coloring material and having a dynamic surface tension at a surface age of 0.1 seconds measured at 25° C. of $\gamma_1$(0.1 s); and depositing droplets of a second liquid on a region of the recording medium where the first liquid has a form of a liquid film having a thickness allowing the deposited droplets of the second liquid to submerge in the liquid film of the first liquid, the second liquid containing coloring material and having a dynamic surface tension at a surface age of 0.1 seconds measured at 25° C. of $\gamma_2$(0.1 s) that is greater than $\gamma_1$(0.1 s).

2. The image forming method as described in claim 1, wherein in the applying step of the first liquid, the first liquid is applied to form the liquid film having an average thickness of not less than 1.6 μm on the recording medium.

3. The image forming method as defined in claim 1, further comprising the step of:

after the depositing step of the droplets of the second liquid, irradiating the recording medium with radiation, wherein the second liquid contains a second polymerizable compound which is curable by the radiation.

4. The image forming method as defined in claim 3, wherein the first liquid contains a first polymerizable compound which is curable by the radiation.

5. The image forming method as defined in claim 3, wherein a polymerization initiator is contained in one of the first liquid and the second liquid.

6. The image forming method as defined in claim 3, wherein:

the first liquid contains an oxirane compound serving as a first polymerizable compound which is curable by the radiation;

and the second liquid contains a polymerization initiator, and contains an oxetane compound as the second polymerizable compound.

7. The image forming method as defined in claim 1, wherein the applying step of the first liquid includes the step of depositing droplets of the first liquid on the recording medium.

8. The image forming method as defined in claim 7, wherein the first liquid has a static surface tension of not grater than 25 mN/m.

9. The image forming method as defined in claim 1, wherein the depositing step of the droplets of the second liquid d is performed in a single pass.

10. An image forming apparatus which forms a desired image on a recording medium, comprising:

a first liquid application device which applies a first liquid on the recording medium, the first liquid containing no coloring material and having a dynamic surface tension at a surface age of 0.1 seconds measured at 25° C. of $\gamma_1$(0.1 s); and a second liquid application device which deposits droplets of a second liquid on a region of the recording medium where the first liquid has a form of a liquid film having a thickness allowing the deposited droplets of the second liquid to submerge in the liquid film of the first liquid, the second liquid containing coloring material and having a dynamic surface tension at a surface age of 0.1 seconds measured at 25° C. of $\gamma_2$(0.1 s) that is greater than $\gamma_1$(0.1 s).

* * * * *